United States Patent
Nakamura

(10) Patent No.: US 9,703,104 B2
(45) Date of Patent: Jul. 11, 2017

(54) ELECTRO-OPTICAL DEVICE COMPRISING FIRST, SECOND, AND THIRD COLOR BEAMS HAVING DIFFERENT INCIDENT ANGLES RELATIVE TO A LIGHT GATHERING ELEMENT AND ELECTRONIC APPARATUS

(71) Applicant: SEIKO EPSON CORPORATION, Tokyo (JP)

(72) Inventor: Norio Nakamura, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/092,978

(22) Filed: Apr. 7, 2016

(65) Prior Publication Data

US 2016/0337625 A1  Nov. 17, 2016

(30) Foreign Application Priority Data

May 14, 2015  (JP) .................................. 2015-098824

(51) Int. Cl.
*H04N 9/31* (2006.01)
*G02F 1/1335* (2006.01)
*G02B 27/10* (2006.01)

(52) U.S. Cl.
CPC ... *G02B 27/1053* (2013.01); *G02F 1/133512* (2013.01); *G02F 1/133621* (2013.01); *H04N 9/3108* (2013.01)

(58) Field of Classification Search
CPC .............. H04N 9/3158; H04N 9/3108; G02F 1/133621; G02B 27/1053; G03B 21/006; G03B 21/005
See application file for complete search history.

(56) References Cited

U.S. PATENT DOCUMENTS

| | | | |
|---|---|---|---|
| 5,161,042 A | 11/1992 | Hamada | |
| 6,320,628 B1 * | 11/2001 | Tsujikawa | G02B 27/1053 348/751 |
| 6,678,023 B1 * | 1/2004 | Yamazaki | H04N 9/3108 348/E9.027 |

(Continued)

FOREIGN PATENT DOCUMENTS

| JP | H04-60538 A | 2/1992 |
|---|---|---|
| JP | H06-51301 A | 2/1994 |

(Continued)

*Primary Examiner* — Paul Lee
(74) *Attorney, Agent, or Firm* — Oliff PLC

(57) ABSTRACT

As an electro-optical device, a liquid crystal device includes micro lenses ML each of which is provided as a light-gathering element for the corresponding one of pixels, and further includes a light-shielding portion. Red (R), green (G), and blue (B) beams enter the micro lens ML at angles different from one another. The light-shielding portion partitions off a first opening portion corresponding to a sub pixel, a second opening portion corresponding to a sub pixel, and a third opening portion corresponding to a sub pixel from one another. When the width of the first opening portion in the predetermined direction (X direction) is defined as L1 and when the width of the second opening portion or the third opening portion in the predetermined direction is defined as L2, a relationship of L1<L2 holds true.

12 Claims, 11 Drawing Sheets

(56) References Cited

U.S. PATENT DOCUMENTS

| | | | |
|---|---|---|---|
| 2003/0147015 A1* | 8/2003 | Katoh | G02F 1/13363 349/5 |
| 2004/0105077 A1* | 6/2004 | Kim | G02B 26/0875 353/31 |
| 2005/0068475 A1 | 3/2005 | Kume et al. | |
| 2005/0174649 A1* | 8/2005 | Okada | G02B 3/0012 359/619 |
| 2005/0248736 A1* | 11/2005 | Itoh | G03B 21/006 353/102 |
| 2007/0085862 A1 | 4/2007 | Moriya et al. | |
| 2009/0033875 A1* | 2/2009 | King | G03B 21/005 353/31 |
| 2009/0128720 A1* | 5/2009 | Toriyama | G02F 1/134336 349/8 |
| 2011/0085116 A1* | 4/2011 | Kim | G02B 5/32 349/106 |
| 2013/0027670 A1* | 1/2013 | Akiyama | G02B 27/102 353/31 |
| 2013/0033681 A1* | 2/2013 | Akiyama | G02B 13/16 353/31 |

FOREIGN PATENT DOCUMENTS

| | | |
|---|---|---|
| JP | H08-84347 A | 3/1996 |
| JP | 2005-010382 A | 1/2005 |
| JP | 2005-099592 A | 4/2005 |
| JP | 2006-098452 A | 4/2006 |
| JP | 2007-140456 A | 6/2007 |

* cited by examiner

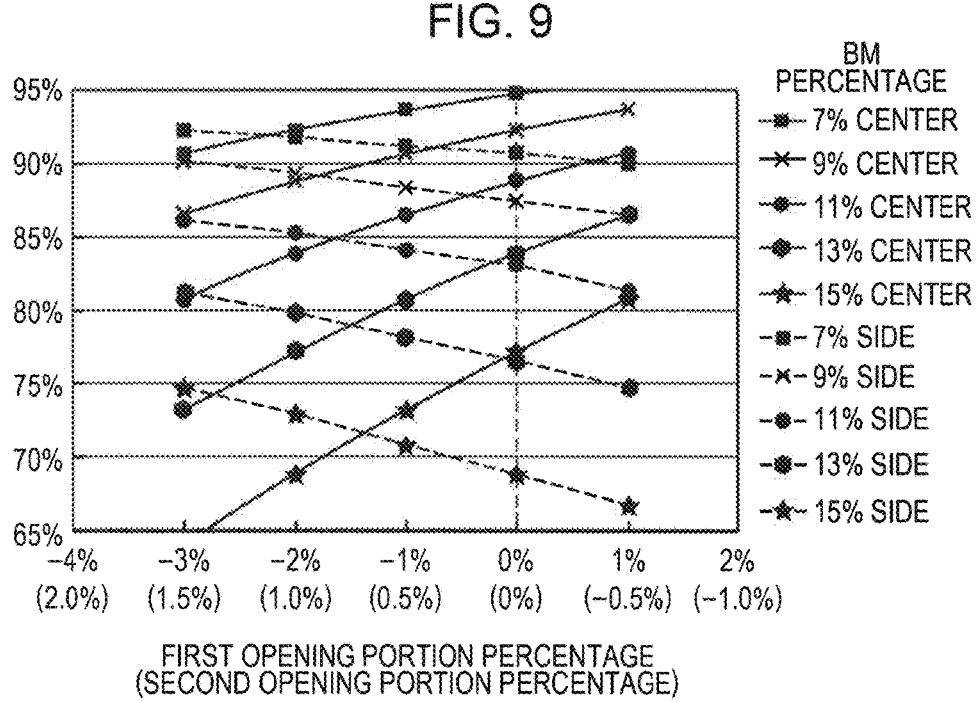
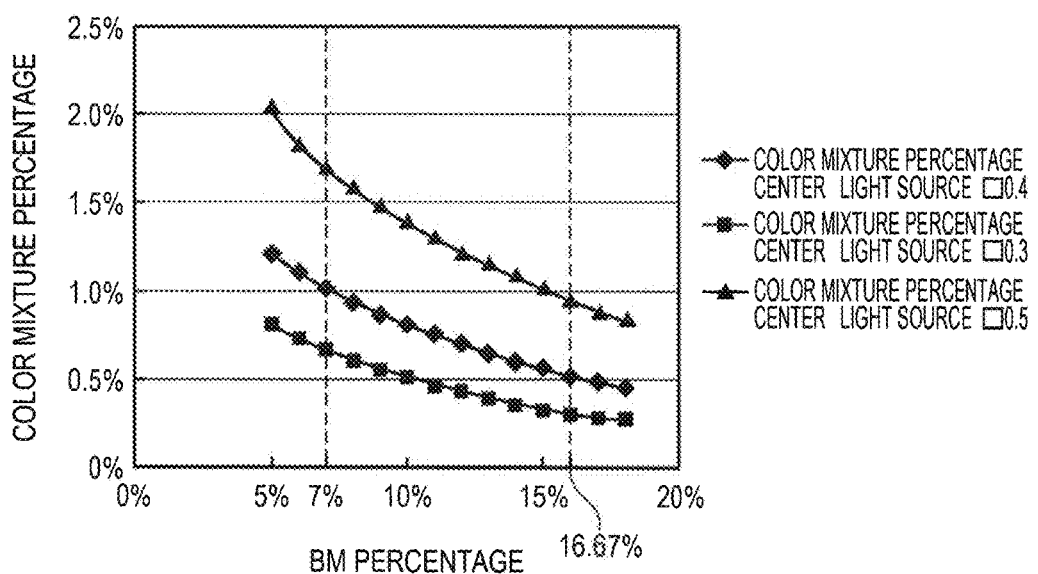

ELECTRO-OPTICAL DEVICE COMPRISING FIRST, SECOND, AND THIRD COLOR BEAMS HAVING DIFFERENT INCIDENT ANGLES RELATIVE TO A LIGHT GATHERING ELEMENT AND ELECTRONIC APPARATUS

BACKGROUND

1. Technical Field

The present invention relates to an electro-optical device and an electronic apparatus.

2. Related Art

As an example of an electro-optical device, an image display device disclosed in JP-A-2005-010382 is known. This image display device has a plurality of pixels each of which has first, second, and third pixel opening portions. A beam of light emitted from a light source is split into first, second, and third color beams, the wavelength regions of which are different from one another. The first, second, and third color beams enter the first, second, and third pixel opening portions, respectively. In this image display device, the second pixel opening portions and the third pixel opening portions are arranged at a predetermined pitch (P) in a predetermined direction, with the first pixel opening portions centered therebetween. The center of the light-gathering spot of the first color beam is located inside the first pixel opening portion. The center of the light-gathering spot of the second color beam is located inside the second pixel opening portion. The center of the light-gathering spot of the third color beam is located inside the third pixel opening portion. When viewed in the predetermined direction, at least either one (D) of the distance between the center of the light-gathering spot of the first color beam and the center of the light-gathering spot of the second color beam (Da) and the distance between the center of the light-gathering spot of the first color beam and the center of the light-gathering spot of the third color beam (Db) is greater than the pitch (P) mentioned above.

It is disclosed in the above-mentioned publication that, with the above settings of the center positions of the light-gathering spots, it is possible to provide an image display device that is less susceptible to color mixture without using any color filter.

In the image display device disclosed in the above-mentioned publication, the beam of light emitted from the light source enters three dichroic mirrors, which function as a color separation element, to be split thereat into the first, second, and third color beams. Having gone out of the three dichroic mirrors at respective angles that are different from one another, the first, second, and third color beams enter a micro lens, which functions as a light-gathering element. A micro lens is provided for each of pixels with one-to-one correspondence. The principal light of the first color beam gathered by the micro lens enters the first pixel opening portion in the normal-line direction. For this reason, it is relatively easy to form the light-gathering spot of the first color beam efficiently inside the first pixel opening portion. In other words, it is unlikely that a substantial part of the light-gathering spot of the first color beam will be formed inside the light-shielding portion surrounding the first pixel opening portion and partitioning it off from the other pixel opening portions. In contrast, the principal light of the second color beam gathered by the micro lens enters the second pixel opening portion in an oblique direction with respect to the normal-line direction. The principal light of the third color beam gathered by the micro lens enters the third pixel opening portion in an oblique direction with respect to the normal-line direction similarly to the principal light of the second color beam. For this reason, it is relatively difficult to form the light-gathering spot of the second color beam and the light-gathering spot of the third color beam efficiently inside the second pixel opening portion and the third pixel opening portion respectively; that is, it is more likely that a part of the light-gathering spot of the second, third color beam will be formed inside the light-shielding portion between the pixel opening portions. Therefore, though the disclosed structure of the publication makes the mixture of the second color beam or the third color beam with the first color beam less likely to occur, display is dark because optical transmittance at the second pixel opening portion and the third pixel opening portion is lower than that at the first pixel opening portion. Moreover, there is a risk of the mixture of the second color beam and the third color beam with each other.

Furthermore, if actual optical transmittance at other pixel opening portions is adjusted for the purpose of white-balance display adjustment while taking, as the reference for the adjustment, the optical transmittance at the second pixel opening portions or the third pixel opening portions, which is lower than that at the first pixel opening portions, there is a risk of worsened display darkness.

SUMMARY

The invention can be embodied in the following application examples or modes.

Application Example

An electro-optical device according to this application example comprises: a plurality of pixels each of which includes a first sub pixel, a second sub pixel that is located adjacent to the first sub pixel in a predetermined direction, and a third sub pixel, light emitted from a light source being split into a first color beam, a second color beam, and a third color beam, wavelengths of the first, second, and third color beams being different from one another, the first color beam entering the first sub pixel, the second color beam entering the second sub pixel, and the third color beam entering the third sub pixel; a plurality of light-gathering elements each of which is provided for the corresponding one of the pixels, the first, second, and third color beams entering the light-gathering element at respective angles of incidence that are different from one another; a light-shielding portion that partitions off a first opening portion, a second opening portion, and a third opening portion from one another, the first opening portion corresponding to the first sub pixel, the second opening portion corresponding to the second sub pixel, and the third opening portion corresponding to the third sub pixel, wherein, when a width of the first opening portion in the predetermined direction is defined as L1 and when a width of the second opening portion or the third opening portion in the predetermined direction is defined as L2, a relationship of L1<L2 holds true.

In this application example, at the second opening portion located adjacent to the first opening portion in the predetermined direction, though the second color beam enters the second opening portion in an oblique direction with respect to the normal-line direction, the transmittance of the second color beam passing through the second opening portion is less likely to decrease because the width L2 of the second opening portion is greater than the width L1 of the first opening portion. For the same reason as that for the second opening portion, at the third opening portion located adjacent to the first opening portion in the predetermined direction, the transmittance of the third color beam passing through the third opening portion is less likely to decrease. Since the greater width makes optical transmittance at the second opening portion or the third opening portion harder to decrease than that at the first opening portion, it is possible to provide an electro-optical device that is capable of performing bright color display without using any color filter. Moreover, since the greater width makes optical transmittance at the second opening portion or the third opening portion harder to decrease than that at the first opening portion, even if the transmittance at each sub pixel is adjusted for the purpose of white-balance display adjustment, it is possible to perform bright color display.

In the electro-optical device according to the above application example, preferably, a width of the light-shielding portion between the first opening portion and the second opening portion in the predetermined direction should be the same as a width of the light-shielding portion between the first opening portion and the third opening portion in the predetermined direction. Because of equality in the width of the light-shielding portion between the opening portions in the predetermined direction, this preferred structure reduces the risk of the mixture of the different color beams.

In the electro-optical device according to the above application example, preferably, a relationship of $0.84<L1/L2<1.00$ should hold true. With this preferred structure, it is possible to provide an electro-optical device that is capable of performing bright color display without a significant decrease in optical transmittance at the first opening portion in comparison with that at the second opening portion or the third opening portion.

In the electro-optical device according to the above application example, preferably, the percentage of the width of the light-shielding portion in the predetermined direction in relation to the arrangement pitch of the pixels in the predetermined direction should be not less than 7% but not greater than 16.67%. With this preferred structure, it is possible to ensure sufficient optical transmittance at each opening portion while reducing the risk of the occurrence of color mixture.

In the electro-optical device according to the above application example, preferably, the wavelength of the first color beam should be shorter than that of the second color beam and the third color beam. In this preferred structure, since the wavelength of the first color beam entering the first opening portion is shorter than that of the second color beam and the third color beam, even if the width L1 of the first opening portion is set to be less than the width L2 of the second opening portion, or that of the third opening portion, it is relatively easy to form the light-gathering spot of the first color beam of light gathered by the light-gathering element efficiently inside the first pixel opening portion. In other words, as compared with a case where the second color beam or the third color beam enters the first opening portion, it is possible to decrease the width L1 of the first opening portion and to increase the width of the second opening portion or the third opening portion. That is, brighter color display is realized.

In the above electro-optical device, preferably, when the wavelengths of the first, second, and third color beams are defined as $\lambda 1$, $\lambda 2$, and $\lambda 3$ respectively, a relationship of $\lambda 1<\lambda 2<\lambda 3$ should hold true; and, when the widths of the first, second, and third opening portions are defined as L1, L2, and L3 respectively, a relationship of $L1<L2<L3$ should hold true. In this preferred structure, the width of each opening portion in the predetermined direction is set in accordance with the wavelength of the corresponding color beam. Therefore, it is possible to optimize the transmittance of each color beam at the corresponding sub pixel, resulting in brighter color display.

Application Example

An electronic apparatus according to this application example comprises: the electro-optical device according to the above application example; the light source; and a color separation element that splits the light emitted from the light source into the first, second, and third color beams, the wavelengths of which are different from one another. With this application example, it is possible to provide an electronic apparatus that is capable of performing bright and beautiful color display.

BRIEF DESCRIPTION OF THE DRAWINGS

The invention will be described with reference to the accompanying drawings, wherein like numbers reference like elements.

FIG. 9 is a combination of the graph of FIG. 7 and the graph of FIG. 8.

FIG. 10 is a graph that shows a relationship among light-shielding portion percentage, color mixture percentage, and light source size.

DESCRIPTION OF EXEMPLARY EMBODIMENTS

With reference to the accompanying drawings, exemplary embodiments of the present invention will now be explained. For easier illustration and understanding of portions, etc. described below, the scale of the drawings is increased or decreased where necessary.

Electronic Apparatus

Figure 1:
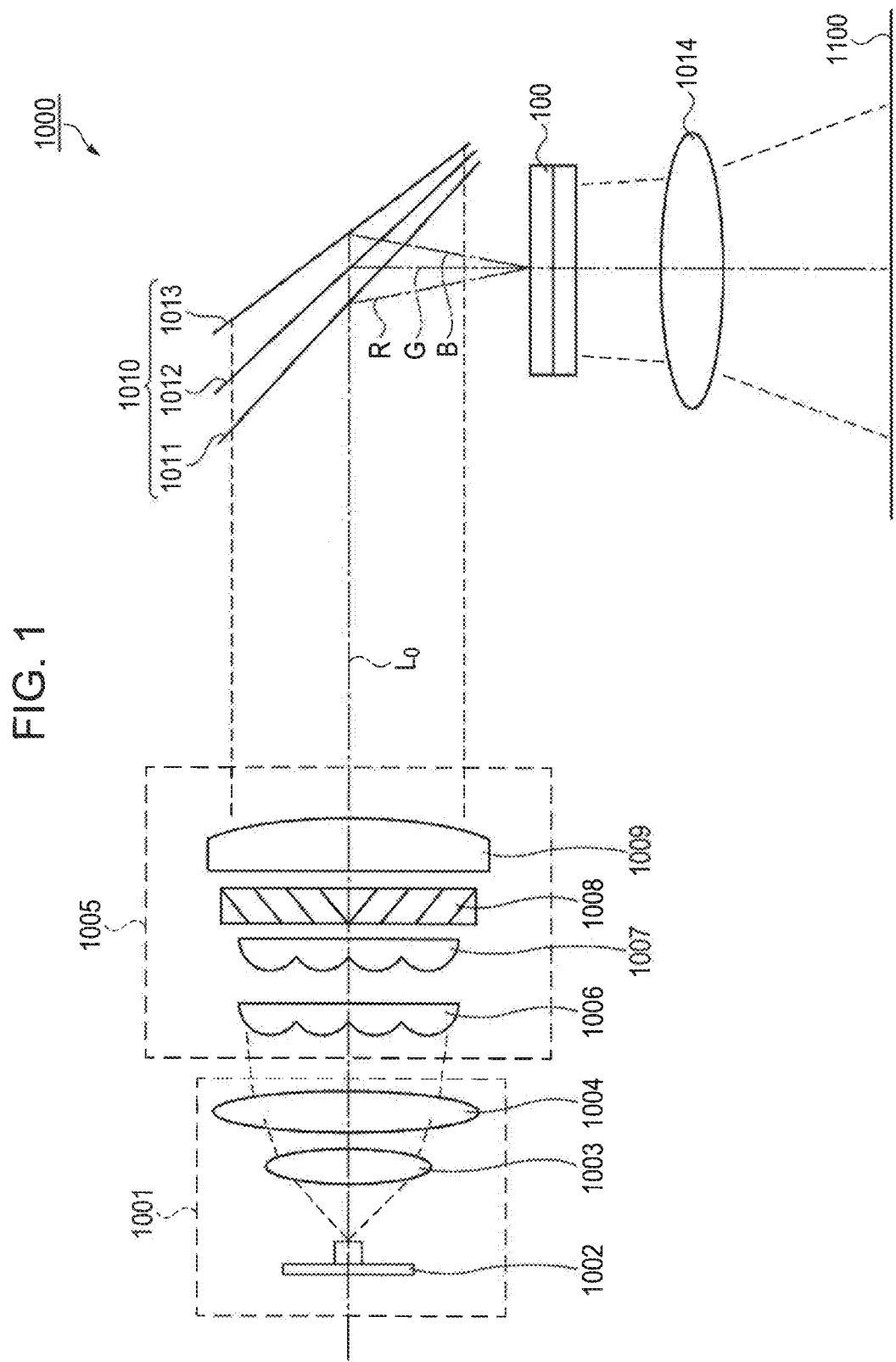
FIG. 1 is a schematic view of the structure of a projection-type display device that is an example of an electronic apparatus.

First, with reference to FIG. 1, an electronic apparatus to which an electro-optical device according to the present embodiment is applied will now be explained. A projection-type display device is taken as an example here. FIG. 1 is a schematic view of the structure of a projection-type display device that is an example of an electronic apparatus.

As illustrated in FIG. 1, a projection-type display device 1000, which is an electronic apparatus according to the present embodiment, includes, on an optical system axis $L_0$, a light source unit 1001, a polarization conversion unit 1005, a color separation element 1010, a liquid crystal device 100, and a projection lens 1014. The liquid crystal device 100 is an example of an electro-optical device. The projection lens 1014 is an example of a projection optical system. The polarization conversion unit 1005 converts light emitted from the light source unit 1001 into a polarized beam that has a predetermined beam diameter. The polarized beam enters the color separation element 1010. The color separation element 1010 splits the incoming polarized beam into a red beam (R), a green beam (G), and a blue beam (B), the wavelengths of which are different from one another. The outgoing beams are directed toward the liquid crystal device 100 at respective angles that are different from one another. The liquid crystal device 100 is an optical modulator. Specifically, the liquid crystal device 100 modulates each of the red beam (R), the green beam (G), and the blue beam (B), which come in at respective angles that are different from one another, optically on the basis of image information. The liquid crystal device 100 outputs the result of optical modulation as display light. The outputted display light is projected with magnification by the projection lens 1014 onto, for example, a projection screen 1100. Depending on the layout of the components described above, the projection-type display device 1000 may include a beam-guiding optical system between them. For example, a relay lens, a mirror (reflection plate), and the like may be provided as the beam-guiding optical system between the polarization conversion unit 1005 and the color separation element 1010. The layout of the components is not limited to the above example. The optical system is not limited to the above example. "The wavelengths of color beams are different from one another" means that their representative wavelengths (brightness peak wavelengths) are different from one another.

The light source unit 1001 includes a light source 1002, a first collimator lens 1003, and a second collimator lens 1004. White emitted light can be obtained from the light source 1002. The diameter of the second collimator lens 1004 is different from that of the first collimator lens 1003. In the light source unit 1001, light emitted from the light source 1002 is magnified by means of the two collimator lenses (optical collimator system) so as to obtain a beam that has a predetermined diameter. An example of the light source 1002 is a light emitting diode (LED) or a laser that can be handled as a point source of light. A combination of red, green, and blue LEDs/laser may be used as the light source 1002 for white light emission. Alternatively, a combination of blue and yellow LEDs/laser may be used as the light source 1002 for white light emission.

The polarization conversion unit 1005 converts a beam that comes in with a predetermined diameter from the light source unit 1001 into a linear uniform-directional polarized beam, and outputs it. The polarization conversion unit 1005 includes a first lens array 1006, a second lens array 1007, a polarization conversion element 1008, and a superimposing lens 1009. Specifically, each of the first lens array 1006 and the second lens array 1007 includes plural lenslets that are arranged in a matrix pattern on a plane orthogonal to the optical system axis $L_0$. When the incoming beam passes through these lens arrays of the polarization conversion unit 1005, it is split into beam segments corresponding to the lenslets. The beam segments are converted into linear polarized light by the polarization conversion element 1008 to be outputted after superimposition by the superimposing lens 1009. The superimposing lens 1009 is optically designed in such a way as to cause the superimposed linear polarized light (polarized light) to enter the display area of the liquid crystal device 100.

For example, it is possible to use dichroic mirrors as the components of the color separation element 1010. Specifically, the color separation element 1010 is made up of two dichroic mirrors 1011 and 1012 and a reflection mirror 1013. The dichroic mirrors 1011 and 1012 and the reflection mirror 1013 are arranged with respective angles of inclination that are different from one another with respect to the optical system axis $L_0$. There is an increasing relationship among the angles of inclination of the dichroic mirrors 1011 and 1012 and the reflection mirror 1013 in this order when viewed from the polarization conversion unit 1005 along the optical system axis $L_0$. More specifically, the dichroic mirror 1011 is positioned with the smallest angle of inclination with respect to the optical system axis $L_0$. Among the polarized color components of the light coming in along the optical system axis $L_0$, the dichroic mirror 1011 reflects the red beam (R), which has the longest wavelength, and allows the green beam (G) and the blue beam (B), the wavelength of each of which is shorter than that of the red beam (R), to pass therethrough. The dichroic mirror 1012 is positioned with the intermediate angle of inclination with respect to the optical system axis $L_0$. The dichroic mirror 1012 reflects the green beam (G), and allows the blue beam (B), the wavelength of which is shorter than that of the green beam (G), to pass therethrough. The reflection mirror 1013 is positioned with the largest angle of inclination with respect to the optical system axis $L_0$. The reflection mirror 1013 reflects the blue beam (B) having passed through the dichroic mirror 1012.

The green beam (G) having been reflected by the dichroic mirror 1012 enters the light incidence surface of the liquid crystal device 100 in the normal-line direction. The red beam (G) having been reflected by the dichroic mirror 1011 enters the light incidence surface of the liquid crystal device 100 obliquely at a predetermined angle of incidence with respect to the normal-line direction. The blue beam (B) having been reflected by the reflection mirror 1013 enters the light incidence surface of the liquid crystal device 100 obliquely at a predetermined angle of incidence with respect to the normal-line direction. In other words, the color separation element 1010 and the liquid crystal device 100 are arranged in relation to each other in such a way that the green beam (G) will enter the light incidence surface of the liquid crystal device 100 in the normal-line direction and that each of the red beam (G) and the blue beam (B) will enter the light incidence surface of the liquid crystal device 100 obliquely at a predetermined angle of incidence with respect to the normal-line direction.

The liquid crystal device 100 has an improved pixel structure so as to be able to perform bright display by making efficient use of the red beam (R), the green beam (G), and the blue beam (B), the angles of incidence of which are different from one another, optically without using any color filter. A detailed explanation of the liquid crystal device 100 will be given later.

Figure 2A:
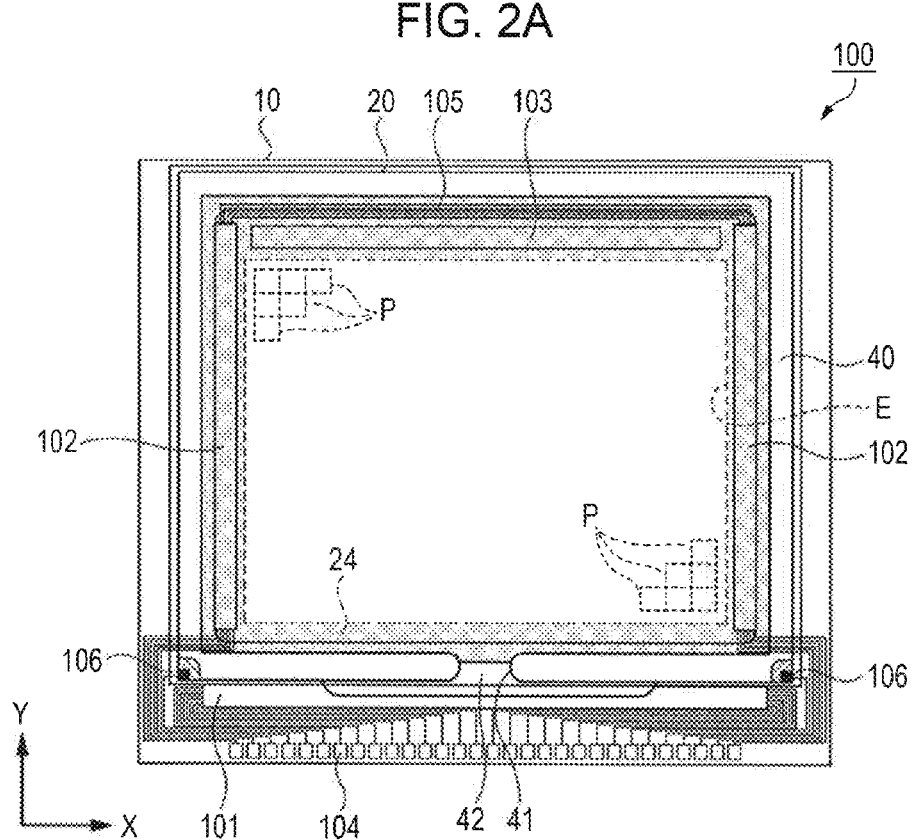
FIG. 2A is a schematic plan view of the structure of a liquid crystal device.
Figure 2B:
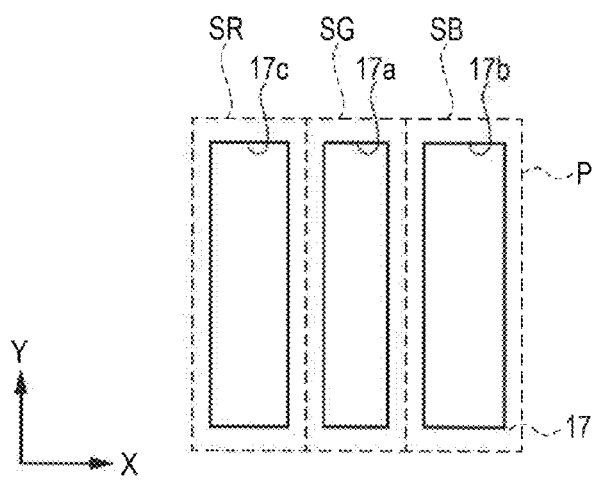
FIG. 2B is a schematic enlarged plan view of the structure of a pixel.
Figure 3:
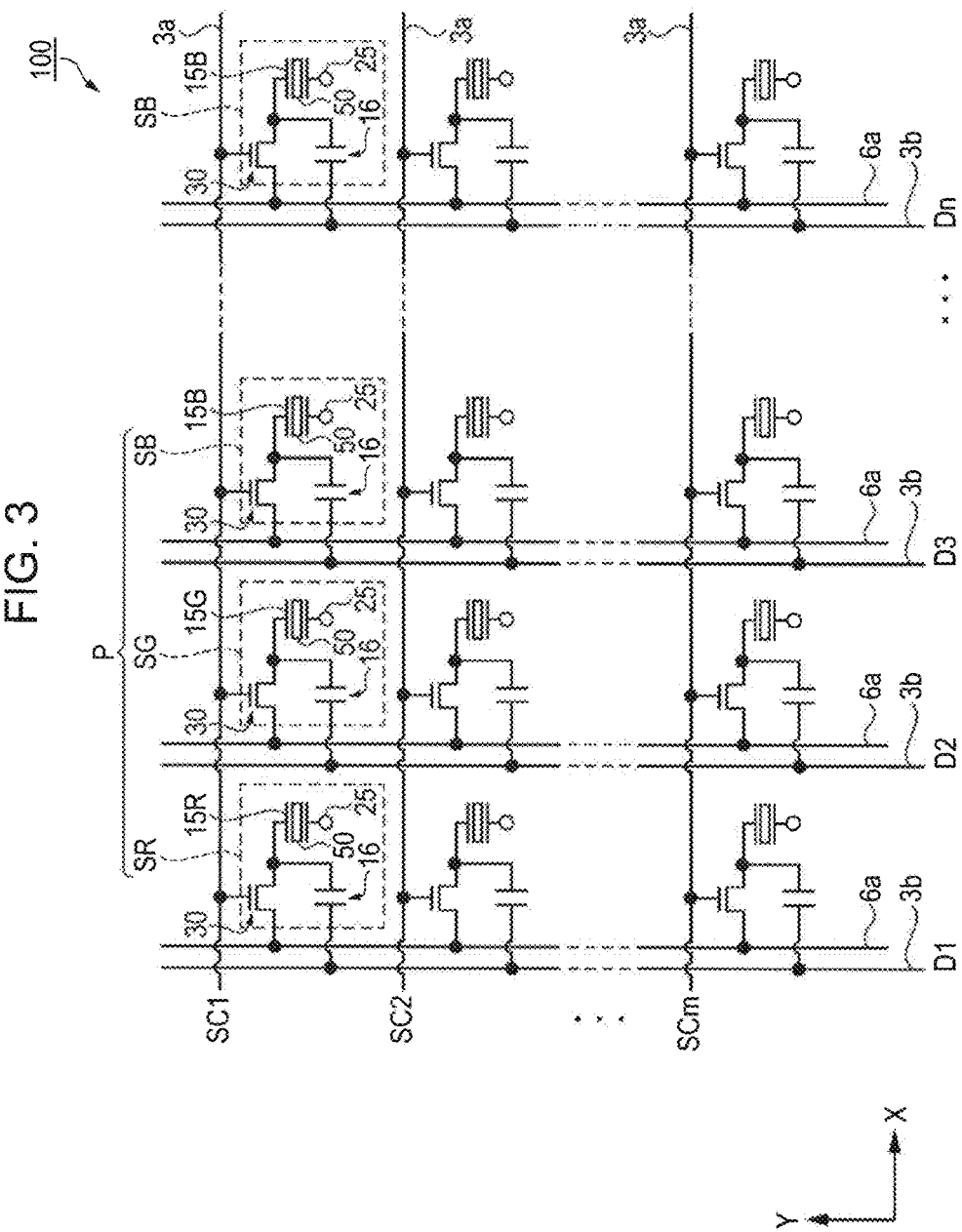
FIG. 3 is an equivalent circuit diagram that illustrates the electric configuration of the liquid crystal device.
Figure 4A:
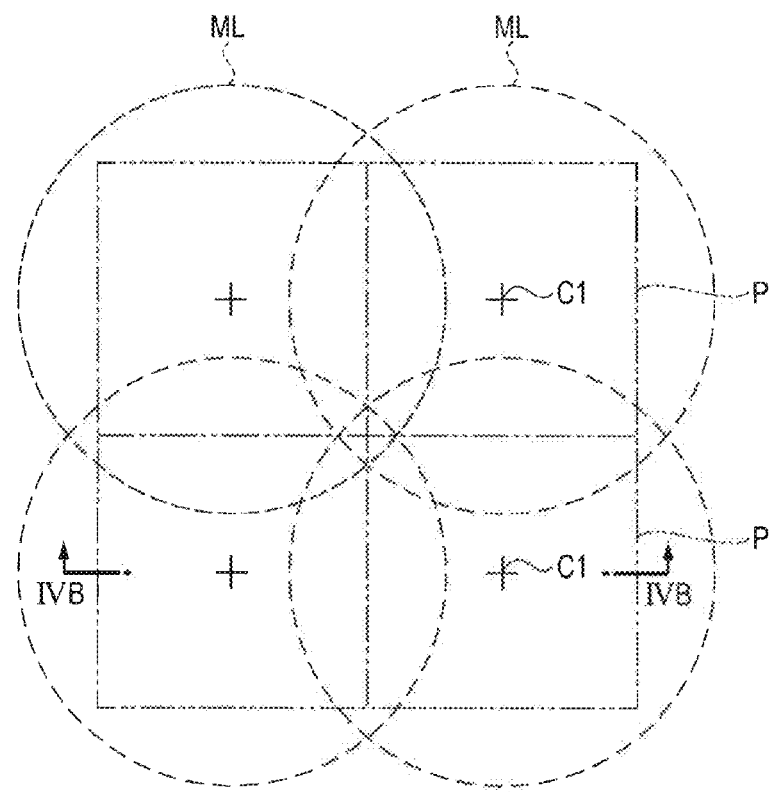
FIG. 4A is a schematic plan view of the arrangement of micro lenses in an opposite substrate.
Figure 4B:
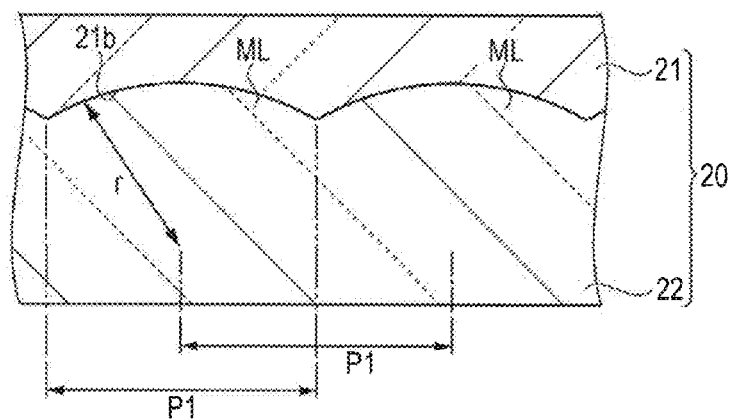
FIG. 4B is a schematic sectional view of the structure of a micro lens array in the opposite substrate taken along the line IVB-IVB in FIG. 4A.
Figure 5A:
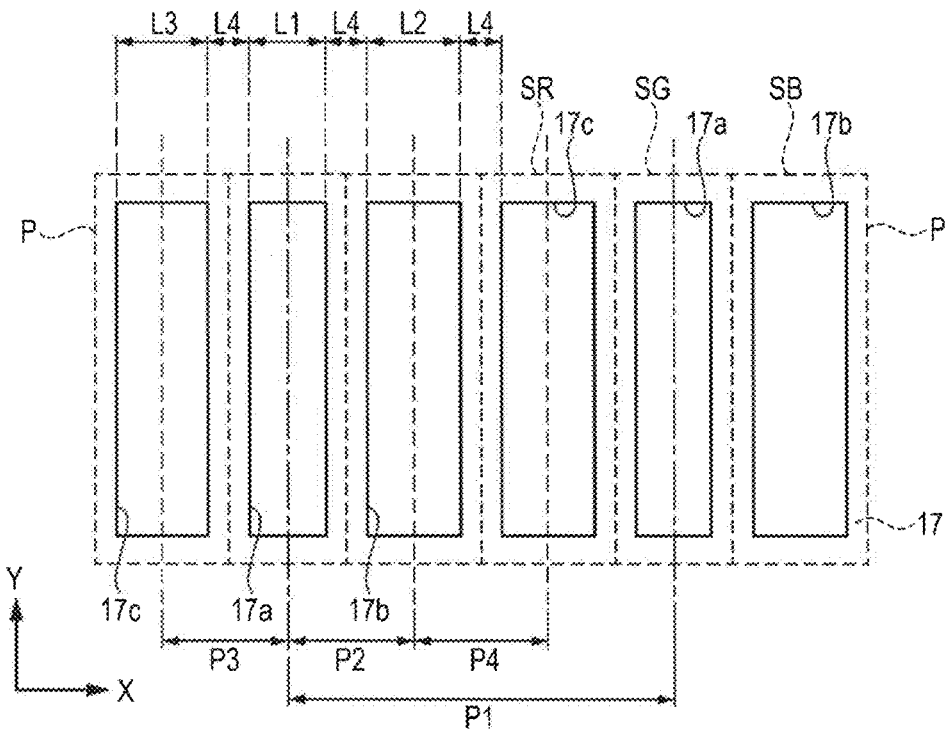
FIG. 5A is a plan view of the arrangement of sub pixels in a pixel according to a first embodiment.
Figure 5B:
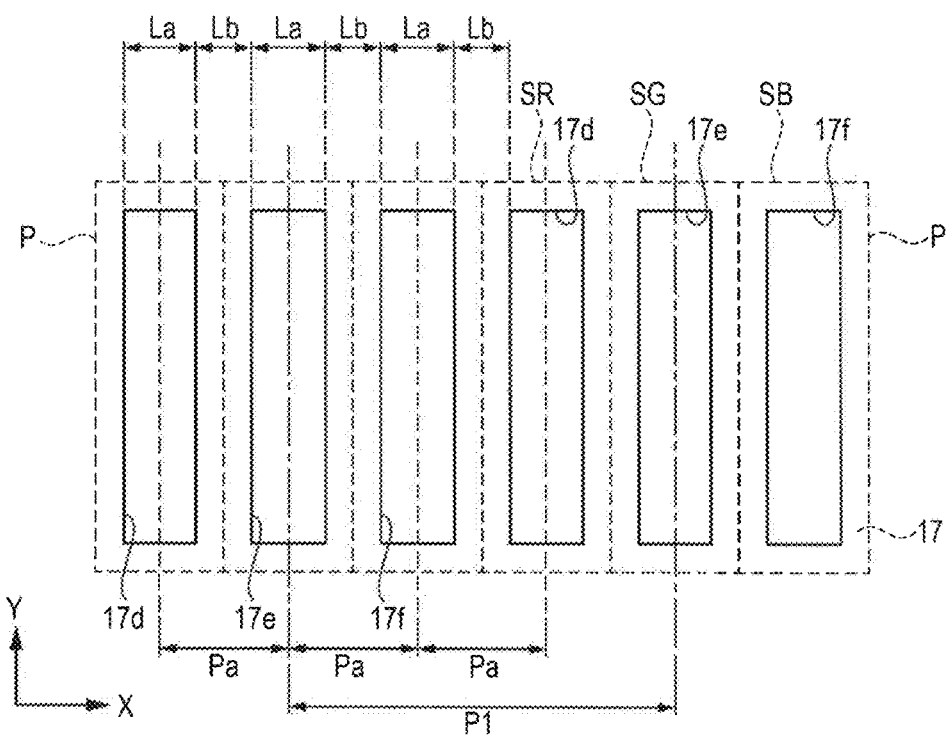
FIG. 5B is a plan view of the arrangement of sub pixels in a pixel according to prior art.
Figure 6:
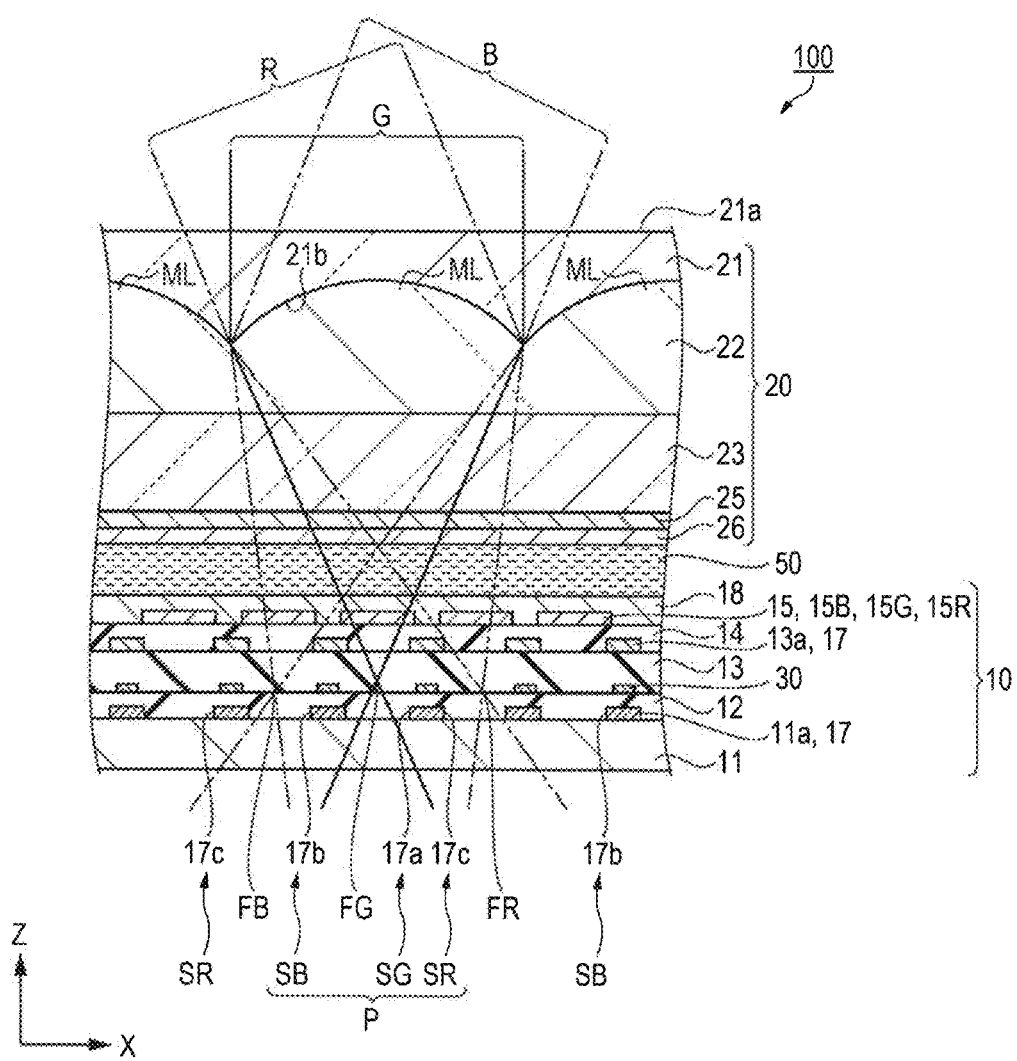
FIG. 6 is a schematic sectional view of the structure of a pixel in a liquid crystal device according to the first embodiment.

With the projection-type display device 1000 described above, it is possible to project a bright and beautiful image.
Electro-Optical Device Next, with reference to FIGS. 2A to 6, the liquid crystal device 100, which is an electro-optical device according to the present embodiment, will now be explained. FIG. 2A is a schematic plan view of the structure of a liquid crystal device. FIG. 2B is a schematic enlarged plan view of the structure of a pixel. FIG. 3 is an equivalent circuit diagram that illustrates the electric configuration of the liquid crystal device. FIG. 4A is a schematic plan view of the arrangement of micro lenses in an opposite substrate. FIG. 4B is a schematic sectional view of the structure of a micro lens array in the opposite substrate taken along the line IVB-IVB in FIG. 4A. FIG. 5A is a plan view of the arrangement of sub pixels in a pixel according to a first embodiment. FIG. 5B is a plan view of the arrangement of sub pixels in a pixel according to prior art. FIG. 6 is a schematic sectional view of the structure of a pixel in a liquid crystal device according to the first embodiment.

As illustrated in FIG. 2A, the liquid crystal device 100, which is an electro-optical device according to the present embodiment, includes an element substrate 10, an opposite substrate 20, and a liquid crystal layer that is provided between these two substrates. The element substrate 10 and the opposite substrate 20 face each other, with the liquid crystal layer sandwiched therebetween. Each of the body of the element substrate 10 and the body of the opposite substrate 20 is made of a transparent material. For example, quartz or glass is used as the material of the substrate body.

The element substrate 10 is larger than the opposite substrate 20. These two substrates are bonded to each other, with a clearance left therebetween. A sealing material 40 is provided along the periphery of the opposite substrate 20 therebetween. The discontinuous region where the sealing material 40 is not provided is an injection opening 41. Liquid crystal that has positive or negative dielectric anisotropy is injected into the space of the clearance mentioned above through the injection opening 41. For injection of the liquid crystal, a vacuum injection method is used. After the injection, the injection opening 41 is sealed with the use of a sealant 42. The method of putting the liquid crystal into the space of the clearance mentioned above is not limited to the vacuum injection method. For example, an ODF (One Drop Fill) method may be used. In ODF, liquid crystal is dropped to the area inside the sealing material 40, which is provided in a picture-frame shape, and the element substrate 10 and the opposite substrate 20 are bonded to each other under reduced pressure. As the sealing material 40, for example, an adhesive made of thermosetting resin or ultraviolet ray curing resin such as epoxy resin is used. The sealing material 40 contains spacers (not illustrated in the drawing). The function of the spacers is to keep the predetermined invariable clearance mentioned above between the pair of substrates.

There is a display area E inside the sealing material 40. The display area E includes plural pixels P arranged in a matrix pattern. A periphery portion 24, by which the display area E is surrounded, is provided between the sealing material 40 and the display area E. The periphery portion 24 is a light-shielding film made of a light-shielding material, for example, metal or metal oxide. The periphery portion 24 is formed at the opposite-substrate side 20, at which a beam of light enters.

A terminal portion is provided on the element substrate 10. Plural terminals 104 for external connection are arranged at the terminal portion. A data line driving circuit 101 is provided between a first side, along which the terminal portion is provided, and the sealing material 40. The sealing material 40 has a portion extending along a second side, which is the opposite of the first side. A tester circuit 103 is provided between the display area E and the second-side portion of the sealing material 40. The sealing material 40 has a portion extending along a third side, which is perpendicular to the first side, and a portion extending along a fourth side, which is perpendicular to the first side and is the opposite of the third side. A scanning line driving circuit 102 is provided between the display area E and the third-side portion of the sealing material 40. Another scanning line driving circuit 102 is provided between the display area E and the fourth-side portion of the sealing material 40. Plural electric lines 105 for connecting the two scanning line driving circuits 102 to each other are provided between the second-side portion of the sealing material 40 and the tester circuit 103.

Electric lines connected to the data line driving circuit 101 and the scanning line driving circuits 102 are connected to the external connection terminals 104, which are arranged along the first side. The position of the tester circuit 103 is not limited to the example described above. For example, the tester circuit 103 may be provided between the data line driving circuit 101 and the display area E along and inside the sealing material 40. In the description below, the direction along the first side is referred to as X direction, and the direction along the third side is referred to as Y direction. In the description below, view taken in a direction from the opposite substrate 20 toward the element substrate 10 is referred to as "plan view" or "in a plan view".

As illustrated in FIG. 2B, the pixel P includes sub pixels SR, SG, and SB. The sub pixel SG is located at the center of the pixel P in the X direction. The sub pixels SR and SB are arranged next to the sub pixel SG in the X direction. The pixel P has a square shape in a plan view. Each of the sub pixels SR, SG, and SB has a rectangular shape in a plan view. The sub pixel SG has a first opening portion 17a for allowing the green beam (G) to pass therethrough. The sub pixel SB has a second opening portion 17b for allowing the blue beam (B) to pass therethrough. The sub pixel SR has a third opening portion 17c for allowing the red beam (R) to pass therethrough. Each of the first opening portion 17a, the second opening portion 17b, and the third opening portion 17c is surrounded by a light-shielding portion 17. In other words, the first opening portion 17a, the second opening portion 17b, and the third opening portion 17c are formed inside the light-shielding portion 17. Each of these opening portions has a rectangular shape in a plan view. The "rectangular" shape means a rectangular or substantially rectangular shape. The corners of the "rectangular" shape are not necessarily right-angled corners. They may be rounded corners.

The green beam (G) disclosed in the present embodiment corresponds to a first color beam according to the present invention. The blue beam (B) disclosed in the present embodiment corresponds to a second color beam according to the present invention. The red beam (R) disclosed in the present embodiment corresponds to a third color beam according to the present invention. The sub pixel SG disclosed in the present embodiment corresponds to a first sub pixel according to the present invention. The sub pixel SB disclosed in the present embodiment corresponds to a second sub pixel according to the present invention. The sub pixel SR disclosed in the present embodiment corresponds to a third sub pixel according to the present invention.

As illustrated in FIG. 3, the liquid crystal device 100 has plural scanning lines 3a, plural data lines 6a, and plural capacitance lines 3b. The scanning lines 3a and the data lines 6a are signal lines that are provided orthogonally to each other and are insulated from each other in at least the display area E. The capacitance lines 3b are provided in parallel with the data lines 6a. The direction in which the scanning lines 3a extend is the X direction. The direction in which the data lines 6a extend is the Y direction.

Segmented areas are demarcated by the scanning lines 3a, the data lines 6a, and the capacitance lines 3b. In each segmented area corresponding to a sub pixel SR, a pixel electrode 15R, a TFT 30, and a storage capacitor 16 are provided. They constitute the pixel circuit of the sub pixel SR. The pixel circuit structure of each sub pixel SG and each sub pixel SB is the same as that of each sub pixel SR. Therefore, the pixel electrode 15R, the pixel electrode 15G, and the pixel electrode 15B may be collectively referred to as pixel electrode 15. In like manner, the sub pixel SR, the sub pixel SG, and the sub pixel SB may be collectively and simply referred to as sub pixel.

The scanning line 3a is electrically connected to the gate of the TFT 30. The data line 6a is electrically connected to the source of the TFT 30. The pixel electrode 15 is electrically connected to the drain of the TFT 30.

The data lines 6a are connected to the data line driving circuit 101 (refer to FIGS. 2A and 2B). Image signals D1, D2, D3, . . . , and Dn originated from the data line driving circuit 101 are supplied through the data lines 6a to sub pixels. The scanning lines 3a are connected to the scanning line driving circuits 102 (refer to FIGS. 2A and 2B). Scanning signals SC1, SC2, SC3, . . . , and SCm originated from the scanning line driving circuits 102 are supplied through the scanning lines 3a to sub pixels.

The image signals D1 to Dn supplied from the data line driving circuit 101 onto the data lines 6a may be supplied in a line-sequential manner in this order. Alternatively, they may be supplied on a group-by-group basis, wherein two or more data lines 6a that are arranged next to each other are grouped together. The scanning line driving circuits 102 supply the scanning signals SC1 to SCm onto the scanning lines 3a at predetermined timing in a pulsed line-sequential manner.

In the liquid crystal device 100, triggered by an input of the scanning signal SC1-SCm, the TFT 30, which is a switching element, is set into an ON state for a predetermined length of time. As a result, the image signal D1-Dn supplied through the data line 6a is written into the pixel electrode 15 at predetermined timing. The image signal D1-Dn of a predetermined level that has been written into a liquid crystal layer 50 through the pixel electrode 15 is retained for a predetermined length of time between the pixel electrode 15 and an opposite substrate 25, which is a common electrode provided opposite the pixel electrode 15, with the liquid crystal layer 50 sandwiched therebetween. The frequency of the image signal D1-Dn is, for example, 60 Hz.

In order to prevent the leakage of the retained image signal D1-Dn, the storage capacitor 16 is connected in parallel with a liquid crystal capacitor that is formed between the pixel electrode 15 and the opposite substrate 25. The storage capacitor 16 is connected between the drain of the TFT 30 and the capacitance line 3b.

The data lines 6a are connected to the tester circuit 103 illustrated in FIG. 2A. During the manufacturing processes of the liquid crystal device 100, it is possible to check whether there is any problem in the operation of the liquid crystal device 100 or not by detecting the image signals mentioned above. The test circuitry is omitted in the equivalent circuit diagram of FIG. 3.

Peripheral circuitry that drives and controls the pixel circuits of the present embodiment includes the data line driving circuit 101, the scanning line driving circuits 102, and the tester circuit 103. The peripheral circuitry may include a sampling circuit that performs sampling on the image signals mentioned above for supply onto the data lines 6a and/or a pre-charge circuit that supplies a pre-charge signal that has a predetermined voltage level to the data lines 6a before the supply of the image signals mentioned above.

The liquid crystal device 100 is an active-drive-type device. Normally-white-mode optical design, in which sub pixel transmittance is at the highest level in a state in which no voltage is applied, or normally-black-mode optical design, in which sub pixel transmittance is at the lowest level in a state in which no voltage is applied, is employed. A polarizing element is provided at each of the light-incoming side and light-outgoing side of the liquid crystal device 100, depending on optical design. The polarizing elements are omitted in FIG. 1.

The liquid crystal device 100 of the present embodiment is provided with micro lenses, each of which functions as a light-gathering element for the purpose of causing the red beam (R), the green beam (G), and the blue beam (B) to enter the sub pixels SR, SG, and SB respectively, wherein these beams come in from the color separation element 1010 at respective angles that are different from one another as described earlier. A micro lens is provided for each of pixels P with one-to-one correspondence at the opposite-substrate side 20, at which color beams of light enter. With reference to FIGS. 4A and 4B, the arrangement of micro lenses in a plan view in the opposite substrate 20 will now be explained.

As illustrated in FIG. 4A, micro lenses ML formed in the opposite substrate 20 are arranged in an X-Y matrix pattern that corresponds to the array of the square pixels P in a plan view. The opposite substrate 20 has a micro lens array 22 that is made up of the micro lenses ML. As illustrated in FIG. 4B, the micro lenses ML are formed by filling recesses 21b, which are formed in the body 21 of the opposite substrate 20, with a lens material. Each of the recesses 21b, that is, a lens surface, has a concave hemispherical shape with a diminishing substrate thickness toward its bottom. Therefore, the position of the bottom of the recess 21b, that is, the center Cl of the micro lens ML, coincides with the center of the pixel P in a plan view. Let P1 be the arrangement pitch of the pixels P in the X direction and the Y direction. The length of the pixel P in the X direction and the Y direction is the same as P1, and the arrangement pitch of the micro lenses ML in the X direction and the Y direction is also the same as P1.

In the present embodiment, the micro lenses ML, which are circular in a plan view, are arranged in such a way as to partially overlap with one another in the X direction and the Y direction so that the pixels P can receive a larger amount of light than otherwise. Therefore, there is a straight valley line segment at the border between each two adjacent micro lenses ML in the X direction and the Y direction. The diameter of the micro lens ML of the present embodiment (which is twice as great as the radius r) is greater than the diagonal length of the pixel P. The diameter of the micro lens ML may be equal to or less than the diagonal length of the pixel P. The shape of the recess 21*b* (lens surface) defining the surface profile of the micro lens ML is not limited to a concave hemispherical shape. For example, the micro lens ML may be an aspherical lens, the surface profile of which is a combination of a linear side surface and a hemispherical surface. In the present embodiment, the thickness of the micro lens array 22, that is, the length from the bottom plane of the micro lens array 22 to the bottom of the recess 21*b* (i.e., the highest point on the lens surface) is greater than the radius r of the micro lens ML.

Next, with reference to FIGS. 5A and 5B, the arrangement of the sub pixels SR, SG, and SB in each pixel P will now be explained. FIG. 5A is a plan view showing the arrangement of the sub pixels SR, SG, and SB according to the present embodiment. FIG. 5B is a plan view showing the arrangement of the sub pixels SR, SG, and SB according to prior art.

First, prior art will now be explained. As illustrated in FIG. 5B, the sub pixels SR, SG, and SB according to prior art are arranged at equal intervals in the X direction. Let P1 be the arrangement pitch of the pixels P in the X direction. The arrangement pitch of the sub pixels SR, SG, and SB in the X direction, Pa, is ⅓ of P1. The sub pixel SR has an opening portion 17*d*. The sub pixel SG has an opening portion 17*e*. The sub pixel SB has an opening portion 17*f*. Each of the opening portions 17*d*, 17*e*, and 17*f* has a rectangular shape in a plan view. The opening portions 17*d*, 17*e*, and 17*f* have the same size. The opening portions 17*d*, 17*e*, and 17*f* are partitioned off from one another by the light-shielding portion 17. Let La be the width of the opening portion 17*d* in the X direction. Each of the width of the opening portion 17*e* and the width of the opening portion 17*f* in the X direction is the same as La. Let Lb be the width of the light-shielding portion 17 between the opening portion 17*d* and the opening portion 17*e* arranged adjacent to each other in the X direction. The width of the light-shielding portion 17 between the opening portion 17*e* and the opening portion 17*f* arranged adjacent to each other in the X direction is the same as Lb. In addition, the width of the light-shielding portion 17 between the opening portion 17*f* in one of two pixels P arranged adjacent to each other in the X direction and the opening portion 17*d* in the other is also the same as Lb. Though not illustrated in the drawing, the arrangement pitch of the opening portions of sub pixels of the same color in the Y direction is constant. The width of the light-shielding portion 17 between opening portions in the Y direction is also constant.

In contrast, in the present embodiment, as illustrated in FIG. 5A, the width L1 of the first opening portion 17*a* of the sub pixel SG, which is located at the center of the pixel P in the X direction, is less than the width L2 of the second opening portion 17*b* of the sub pixel SB located adjacent to the sub pixel SG in the X direction. The width L3 of the third opening portion 17*c* of the sub pixel SR, which is the other one of the two located adjacent to the sub pixel SG in the X direction, is the same as the width of the second opening portion 17*b* of the sub pixel SB, that is, L2. Therefore, a relationship of L1<L2=L3 holds true. Let L4 be the width of the light-shielding portion 17 between the first opening portion 17*a* and the second opening portion 17*b* arranged adjacent to each other in the X direction. The width of the light-shielding portion 17 between the first opening portion 17*a* and the third opening portion 17*c* arranged adjacent to each other in the X direction is the same as L4. In addition, the width of the light-shielding portion 17 between the third opening portion 17*c* in one of two pixels P arranged adjacent to each other in the X direction and the second opening portion 17*b* in the other is also the same as L4. Let P2 be the arrangement pitch of the sub pixels SG and SB in the X direction. The arrangement pitch P3 of the sub pixels SG and SR in the X direction is the same as P2. The arrangement pitch P4 of the sub pixel SR in one of two pixels P arranged adjacent to each other in the X direction and the sub pixel SB in the other is greater than the arrangement pitch P2 of the sub pixels SG and SB. Therefore, a relationship of P2=P3<P4 holds true. The arrangement pitch P1 of the pixels P is: P1=2×P2+P4.

Next, with reference to FIG. 6, the pixel structure of the present embodiment will now be explained. In addition, color beam transmittance at each sub pixel of the present embodiment will now be explained. As illustrated in FIG. 6, the liquid crystal device 100 includes an element substrate 10 and an opposite substrate 20, which are provided opposite each other, with a liquid crystal layer 50 sandwiched therebetween.

A wiring layer 11*a* is formed on the body 11 of the element substrate 10. The wiring layer 11*a* is made of, for example, high melting metal or alloy. In the equivalent circuit described earlier, the wiring layer 11*a* corresponds to, for example, the scanning lines 3*a*. The wiring layer 11*a* is covered by a first interlayer insulation film 12. On the first interlayer insulation film 12, TFTs 30 corresponding to the sub pixels SR, SG, and SB are formed. The TFTs 30 are covered by a second interlayer insulation film 13. A wiring layer 13*a* is formed on the second interlayer insulation film 13. In the equivalent circuit described earlier, the wiring layer 13*a* corresponds to, for example, the capacitance lines 3*b* and the data lines 6*a*. The wiring layer 13*a* is covered by a third interlayer insulation film 14. Translucent pixel electrodes 15B, 15G, and 15R corresponding to the respective sub pixels SB, SG, and SR are formed on the third interlayer insulation film 14 by, for example, forming a transparent conductive film such as an ITO film and patterning the film. The pixel electrodes 15B, 15G, and 15R are covered by an alignment film 18.

The wiring layers 11*a* and 13*a* overlap with the TFTs 30 in a plan view. The wiring layers 11*a* and 13*a* function as the light-shielding portion 17, which blocks light coming toward the TFTs 30. In the light-shielding portion 17, the first opening portion 17*a* corresponds to the sub pixel SG, which has the pixel electrode 15G. The second opening portion 17*b* corresponds to the sub pixel SB, which has the pixel electrode 15B. The third opening portion 17*c* corresponds to the sub pixel SR, which has the pixel electrode 15R.

The opposite substrate 20 has a micro lens array 22 that is made up of micro lenses ML. The micro lenses ML are formed by filling recesses 21*b*, which are formed in the body 21 of the opposite substrate 20, with a lens material. Each of the recesses 21*b* has a concave hemispherical shape. The micro lens array 22 has a liquid-crystal-layer-side surface, which faces toward the liquid crystal layer 50. After planarization of the liquid-crystal-layer-side surface, a translucent path layer 23 is formed thereon. A transparent conductive film that is made of, for example, ITO, is formed on the path layer 23. An opposite substrate 25 is formed on the transparent conductive film, by which the path layer 23 is covered. The opposite substrate 25 is covered by an alignment film 26. The alignment films 18 and 26 sandwiching the liquid crystal layer 50 are formed by using a material corresponding to liquid crystal selected on the basis of the optical design of the liquid crystal device 100, specifically, for example, by using an organic resin material such as polyimide that makes it possible to align liquid crystal (liquid crystal molecules) that has positive dielectric anisotropy substantially horizontally or by using an inorganic material such as silicon oxide that makes it possible to align liquid crystal (liquid crystal molecules) that has negative dielectric anisotropy substantially vertically. The shape of the recess 21b defining the surface profile of the micro lens ML is not limited to a concave hemispherical shape. For example, the micro lens ML may be an aspherical lens, the surface profile of which is a combination of a linear side surface and a hemispherical surface.

As illustrated in FIG. 6, a red beam (R), a green beam (G), and a blue beam (B) enter the light incidence surface 21a of the opposite substrate 20 at respective angles of incidence that are different from one another. The green beam (G) enters the micro lens ML, which is provided for the pixel P with one-to-one correspondence, in the direction of the line normal to the light incidence surface 21a of the opposite substrate 20. The green beam (G) of light gathered by the micro lens ML passes through the liquid crystal layer 50 and has a focal point (FG) inside the first opening portion 17a of the sub pixel SG at the element-substrate side 10. The blue beam (B) enters the micro lens ML obliquely with respect to the direction of the line normal to the light incidence surface 21a of the opposite substrate 20. The blue beam (B) of light gathered by the micro lens ML passes through the liquid crystal layer 50 and has a focal point (FB) inside the second opening portion 17b of the sub pixel SB at the element-substrate side 10. In like manner, the red beam (R) enters the micro lens ML obliquely with respect to the direction of the line normal to the light incidence surface 21a of the opposite substrate 20. The red beam (R) of light gathered by the micro lens ML passes through the liquid crystal layer 50 and has a focal point (FR) inside the third opening portion 17c of the sub pixel SR at the element-substrate side 10. In other words, the micro lens ML and the path layer 23 are optically designed in such a way that color beams of light that enter the light incidence surface 21a of the opposite substrate 20 at respective angles of incidence that are different from one another will be gathered by the micro lens ML and will focus inside the corresponding opening portions respectively at the element-substrate side 10.

Given that the micro lens ML and the path layer 23 are optically designed as described above, in a case where the aforementioned arrangement of the sub pixels SR, SG, and SB according to prior art is employed, it is not impossible to form the light-gathering spot of the green beam (G), which comes in in the normal-line direction, inside the opening portion 17e of the sub pixel SG, which is located at the center in the X direction, efficiently. However, the spot area of the gathered light in the element substrate 10 for each of the red beam (R) and the blue beam (B), which comes in obliquely with respect to the normal-line direction, is wider than that of the green beam (G). For this reason, the light-gathering spot of the red beam (R) and the light-gathering spot of the blue beam (B) do not form efficiently inside the corresponding opening portions 17d and 17f respectively, meaning that the percentage of blockage by the light-shielding portion 17 for each of the red beam (R) and the blue beam (B) is greater than that of the green beam (G). Therefore, in prior art, optical transmittance at the sub pixel SB, SR is lower than that at the sub pixel SG. That is, there is a possibility of the lack of sufficient brightness in display light outputted from the liquid crystal device 100, which is an optical modulator. Furthermore, if actual optical transmittance for the green beam (G) at the sub pixels SG is adjusted for the purpose of white-balance display adjustment while taking, as the reference for the adjustment, the optical transmittance at the sub pixels SB or the sub pixels SR, which is lower than that at the sub pixels SG, there is a risk of worsened display darkness. That is, if the driving voltage applied to the liquid crystal layer 50 at the sub pixels SG is adjusted while taking it as the reference, there is a risk of worsened display darkness.

In contrast to prior art, in the aforementioned arrangement of the sub pixels SR, SG, and SB according to the present embodiment, the width L1 of the first opening portion 17a of the sub pixel SG, which is located at the center of the pixel P in the X direction, is less than the width L2 of the second opening portion 17b of the sub pixel SB located adjacent to the sub pixel SG in the X direction, and is less than the width L3 of the third opening portion 17c of the sub pixel SR located adjacent to the sub pixel SG in the X direction. Conversely, each of the width L2 of the second opening portion 17b of the sub pixel SB located adjacent to the sub pixel SG in the X direction and the width L3 of the third opening portion 17c of the sub pixel SR located adjacent to the sub pixel SG in the X direction is greater than the width L1 of the first opening portion 17a of the sub pixel SG, which is located at the center of the pixel P in the X direction. For this reason, despite the fact that the spot area of the gathered light in the element substrate 10 for each of the blue beam (B) and the red beam (R), which comes in obliquely with respect to the normal-line direction, is wider than that of the green beam (G), it is possible to form the light-gathering spot of the blue beam (B) and the light-gathering spot of the red beam (R) inside the second opening portion 17b and the third opening portion 17c respectively with high efficiency. In other words, as compared with prior art, for each of the blue beam (B) and the red beam (R) of light gathered by the micro lens ML, it is possible to reduce the percentage of blockage by the light-shielding portion 17 between the opening portions. That is, the disclosed structure realizes bright display by efficiently utilizing color beams of light gathered by the micro lens ML.

In another aspect, for example, if one half of the difference ΔW between the width L1 of the first opening portion 17a of the sub pixel SG, which is located at the center of the pixel P in the X direction, according to the present embodiment and the width La of the opening portion 17e of the sub pixel SG according to prior art is allocated to each of the opening portion 17d of the sub pixel SR and the opening portion 17f of the sub pixel SB according to prior art to make it larger, and if the between-openings width of the light-shielding portion 17 pertaining to the sub pixel SG is Lb, in prior art, it results in a decrease in the width of the light-shielding portion 17 between the opening portion of the sub pixel SR in one of two pixels P arranged adjacent to each other in the X direction and the opening portion of the sub pixel SB in the other. This means a greater risk of the mixture of the blue beam (B) and the red beam (R) with each other, depending on the angle of incidence at which the blue beam (B) enters the micro lens ML and the angle of incidence at which the red beam (R) enters the micro lens ML.

Unlike prior art, in the present embodiment, in order to ensure the equal width L4 of the light-shielding portion 17 between the opening portions arranged adjacent to each other in the X direction, the arrangement pitch P4 of the sub pixel SR in one of two pixels P arranged adjacent to each other in the X direction and the sub pixel SB in the other is designed to be greater than the arrangement pitch P2 of the sub pixel SB in relation to the sub pixel SG. Specifically, an equation of P2=(L1+L2)/2+L4 holds. In addition, an equation of P4=L3+L4 holds. Moreover, an equation of P4=P2+ΔW/4 holds because L2=L1+ΔW/2 and because L2=L3. Therefore, it is possible to reduce the risk of the mixture of beams of different colors entering the micro lens ML obliquely with each other.

Figure 7:
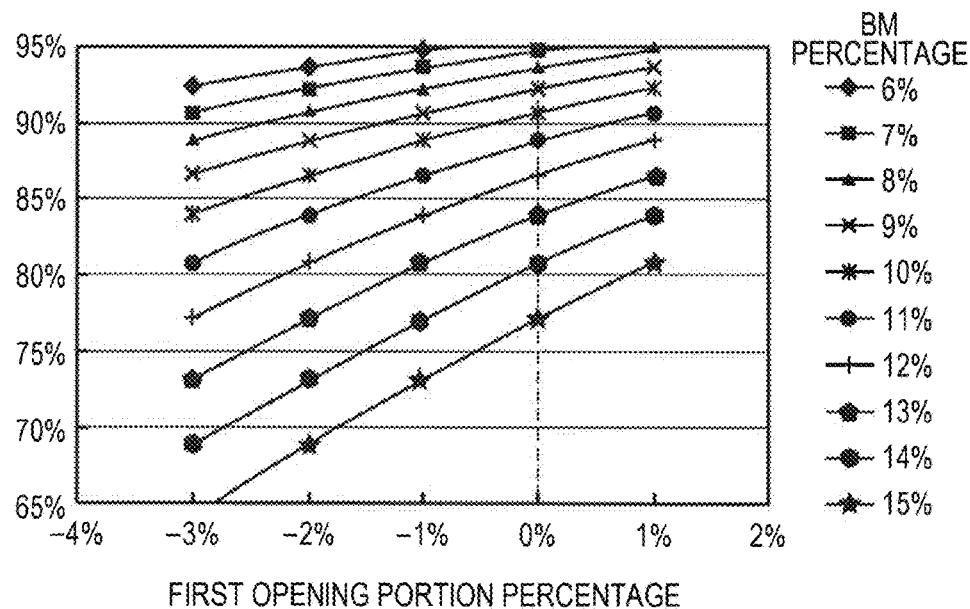
FIG. 7 is a graph that shows a relationship among first opening portion percentage, light-shielding portion percentage, and transmittance.
Figure 8:
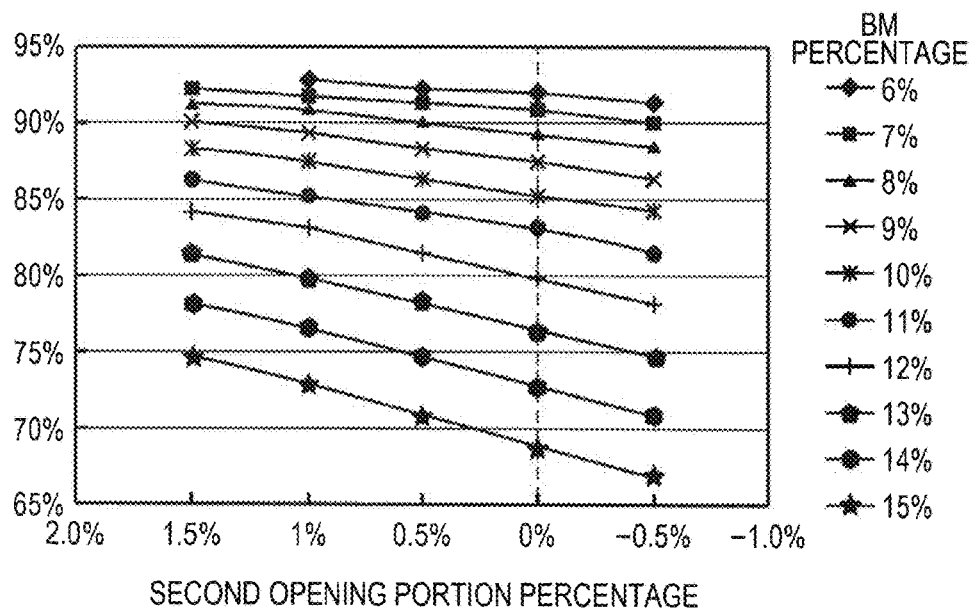
FIG. 8 is a graph that shows a relationship among second opening portion percentage, light-shielding portion percentage, and transmittance.

Next, with reference to FIGS. 7 to 10, preferred arrangement of opening portions in the sub pixels SR, SG, and SB and preferred optical transmittance at the opening portions will now be explained using a more specific example. FIG. 7 is a graph that shows a relationship among first opening portion percentage, "black-matrix" light-shielding portion percentage, and transmittance. FIG. 8 is a graph that shows a relationship among second opening portion percentage, light-shielding portion percentage, and transmittance. FIG. 9 is a combination of the graph of FIG. 7 and the graph of FIG. 8. FIG. 10 is a graph that shows a relationship among light-shielding portion percentage, color mixture percentage, and light source size.

The numerical data in the graphs of FIGS. 7, 8, and 9, which pertain to transmittance, were obtained by running an optical simulation. First, optical conditions on which the optical simulation is based will now be explained.

The length of each side of the pixel P, that is, the arrangement pitch P1, is 10 μm. The substrate body 11, 21 is quartz glass. The index of refraction of the substrate body 11, 21 is 1.46. The index of refraction of the micro lens ML is 1.72. The radius r of the recess (lens surface) 21b is 7.5 μm. The thickness of the micro lens array 22 is 8.0 μm. The distance from the boundary between the micro lenses ML and the path layer 23 to the light-shielding portion 17 (more specifically, the distance therefrom to the wiring layer 13a) is approximately 26.4 μm (refer to FIG. 6). The light emitting area of the light source 1002 has a square size of 0.3 mm×0.3 mm (□) (refer to FIG. 1). The length of the opening portion in each of the sub pixels SR, SG, and SB in the Y direction is 6 μm. Under the above optical conditions, the optical simulation was run while varying the length of each of the opening portions in the X direction and varying the width of the light-shielding portion 17 between the opening portions to measure the transmittance of light passing through each of the opening portions (i.e., the ratio of outgoing light to incoming light). In the graphs of FIGS. 7, 8, and 9, the vertical axis represents the transmittance of light passing through the opening portion, and the horizontal axis represents opening portion percentage. The opening portion percentage is the percentage of an increase or a decrease in the length of the opening portion in the X direction in relation to ⅓ of the arrangement pitch P1 of the pixels P (%), wherein a case of ⅓ of the arrangement pitch P1 of the pixels P as in prior art described earlier is taken as "0%". The light-shielding portion percentage (BM percentage) is the percentage of the width of the light-shielding portion 17 between the opening portions in the X direction in relation to the arrangement pitch P1 of the pixels P (%). The plus/minus direction in the opening portion percentage on the horizontal axis of the graph of FIG. 8 is the opposite of that of FIG. 7.

As illustrated in FIG. 7, if the opening portion percentage of the first opening portion 17a (hereinafter referred to as "first opening portion percentage") is varied within a range from +1% to −3% when the BM percentage is within a range from 6% to 15%, the transmittance of the color beam (G) passing through the first opening portion 17a decreases gradually. Specifically, in a case where the BM percentage relative to the arrangement pitch P1 of the pixels P is 7%, the first opening portion percentage according to prior art is nearly equal to 26.3%, which can be calculated as follows: (100−7×3)/3≈26.3. If 2% is subtracted from the first opening portion percentage according to prior art, the result is 24.3%. In this case, the transmittance is 95% when the first opening portion percentage is 0%, and the transmittance is approximately 92% if with the 2% subtraction from the first opening portion percentage, which means a decrease in transmittance of 3%. In a case where the BM percentage is 11%, the first opening portion percentage according to prior art is: (100−11×3)/3≈22.3%. If 2% is subtracted from the first opening portion percentage according to prior art, the result is 20.3%. In this case, the transmittance is approximately 89% when the first opening portion percentage is 0%, and the transmittance is approximately 84% if with the 2% subtraction from the first opening portion percentage, which means a decrease in transmittance of 5%. In a case where the BM percentage is 15%, the first opening portion percentage according to prior art is: (100−15×3)/3≈18.3%. If 2% is subtracted from the first opening portion percentage according to prior art, the result is 16.3%. In this case, the transmittance is approximately 77% when the first opening portion percentage is 0%, and the transmittance is approximately 69% if with the 2% subtraction from the first opening portion percentage, which means a decrease in transmittance of 8%. As can be seen from the graph and the above description, if the BM percentage is increased from 7% and if the first opening portion percentage is decreased by fixed percentage subtraction, the resultant decrease in transmittance becomes greater.

On the other hand, the width of the second opening portion 17b, which is located adjacent to the first opening portion 17a, increases by ΔW/2, that is, one half of the decrease ΔW in the width of the first opening portion 17a. As illustrated in FIG. 8, if the opening portion percentage of the second opening portion 17b (hereinafter referred to as "second opening portion percentage") is varied within a range from −0.5% to +1.5% when the BM percentage is within a range from 6% to 15%, the transmittance of the color beam (B) passing through the second opening portion 17b increases gradually. Specifically, in a case where the BM percentage relative to the arrangement pitch P1 of the pixels P is 7%, the second opening portion percentage according to prior art is nearly equal to 26.3%, which can be calculated as follows: (100−7×3)/3≈26.3. If 1% is added to the second opening portion percentage according to prior art by subtracting 2% from the first opening portion percentage according to prior art, the result is 27.3% In this case, the transmittance is 91% when the second opening portion percentage is 0%, and the transmittance is approximately 92% if with the 1% addition to the second opening portion percentage, which means an increase in transmittance of 1%. In a case where the BM percentage is 11%, the second opening portion percentage according to prior art is: (100−11×3)/3≈22.3%. If 1% is added to the second opening portion percentage according to prior art, the result is 23.3%. In this case, the transmittance is approximately 83% when the second opening portion percentage is 0%, and the transmittance is approximately 85% if with the 1% addition to the second opening portion percentage, which means an increase in transmittance of 2%. In a case where the BM percentage is 15%, the second opening portion percentage according to prior art is: (100−15×3)/3≈18.3%. If 1% is added to the second opening portion percentage according to prior art, the result is 19.3%. In this case, the transmittance is 69% when the second opening portion percentage is 0%, and the transmittance is approximately 73% if with the 1% addition to the second opening portion percentage, which means an increase in transmittance of 4%. As can be seen from the graph and the above description, if the BM percentage is increased from 7% and if the second opening portion percentage is increased by fixed percentage addition, the resultant increase in transmittance becomes greater. In other words, even if the BM percentage increases, it is possible to improve optical transmittance at the second opening portion 17b by increasing the second opening portion percentage.

FIG. 9 shows, for each of cases where the BM percentage is 7%, 9%, 11%, 13%, and 15%, a combination of the graph of FIG. 7, which shows the decrease in transmittance at the first opening portion 17a, and the graph of FIG. 8, which shows the increase in transmittance at the second opening portion 17b.

As illustrated in FIGS. 7 and 8, in a case where the BM percentage is less than 7%, for example, 6%, the transmittance at the first opening portion 17a and the transmittance at the second opening portion 17b do not change much in response to a change in the opening portion percentage. This means that the change in the opening portion percentage cannot be very effective. Therefore, preferably, the BM percentage should be 7% or greater. When the transmittance at the second opening portion 17b is improved by decreasing the first opening portion percentage and increasing the second opening portion percentage, ideally, the transmittance at the second opening portion 17b should be almost the same as the transmittance at the first opening portion 17a. In addition, even with the improvement in the transmittance at the second opening portion 17b, if the decrease in the transmittance at the first opening portion 17a is in excess of the increase in the transmittance at the second opening portion 17b, it does not result in an improvement in the total transmittance of the pixel P.

Therefore, as illustrated in FIG. 9, in a case where the BM percentage is 7%, at which it is expected that the highest transmittance will be obtained at the first opening portion 17a and the second opening portion 17b of the pixel P, the maximum decrease in the first opening portion percentage should be −3%. If the decrease in the first opening portion percentage is −3% in a case of BM=7%, the first opening portion percentage relative to the arrangement pitch P1 of the pixels P is: 26.3−3=23.3%. The second opening portion percentage is: 26.3+3/2=27.8%. Therefore, the ratio of the width L1 of the first opening portion 17a to the width L2 of the second opening portion 17b, (L1/L2), is: 23.3%/27.8%=0.838 . . . ≈0.84.

Next, with reference to FIG. 10, the relationship between the BM percentage and the color mixture percentage will now be explained. The greater the BM percentage relative to the arrangement pitch P1 of the pixels P is, the less the risk of the mixture of color beams whose wavelengths are different from each other is. On the other hand, brightness at the pixel P depends not only on the transmittance of light at each opening portion but also on the brightness of the light source 1002 and the emission angle of light outputted from the light source 1002. It is believed that the emission angle of light outputted from the light source 1002 depends on the size of the light emitting area of the light source 1002. In the present embodiment, regarding the size of the light source 1002, it is assumed that the light emitting area has a 0.3-mm, 0.4-mm, or 0.5-mm square shape, and the relationship between the BM percentage and the color mixture percentage was studied by running an optical simulation.

As illustrated in FIG. 10, the rise in the color mixture percentage is steeper when the BM percentage is less than 7%, though it depends also on the size of the light source 1002. In order to ensure that the color mixture percentage is less than 1%, the BM percentage should be not less than approximately 16.67%. It is clear from the result of the simulation that, with the BM percentage of 16.67%, which is ⅙ of the arrangement pitch P1 of the pixels P, it is possible to ensure the transmittance of at least approximately 70% at the first opening portion 17a and the second opening portion 17b (the third opening portion 17c).

That is, preferably, the ratio of the width L1 of the first opening portion 17a to the width L2 of the second opening portion 17b, (L1/L2), should be within the following range: 0.84<L1/L2<1.00. More preferably, from the viewpoint of making the difference between the color beam transmittance at the first opening portion 17a and the color beam transmittance at the second opening portion 17b smaller, it should be within the following range: 0.84<L1/L2<0.95. Preferably, the BM percentage relative to the arrangement pitch P1 of the pixels P should be not less than 7% but not greater than 16.67%.

The first embodiment described above produces the following advantageous effects.

(1) There is a relationship of L1<L2 between the width L1 of the first opening portion 17a of the sub pixel SG, which is located at the center of the pixel P in a predetermined direction (the X direction), and the width L2 of the second opening portion 17b of the sub pixel SB located adjacent to the sub pixel SG in the predetermined direction. This structure makes it easier for color beams that have wavelengths that are different from each other to pass through the first opening portion 17a and the second opening portion 17b respectively when these color beams enter the micro lens ML, which is provided for the pixel P with one-to-one correspondence, at respective angles of incidence that are different from each other. The same effect can be obtained by setting a relationship of L1<L3 for the third opening portion 17c of the sub pixel SR, which is the other one of the two located adjacent to the sub pixel SG in the predetermined direction (the X direction). That is, by using the liquid crystal device 100 having the above structure of the sub pixels SR, SG, and SB as an optical modulator, it is possible to provide the projection-type display device 1000 that is capable of performing bright full-color display without using any color filter.

(2) Preferably, the ratio of the width L1 of the first opening portion 17a to the width L2 of the second opening portion 17b, (L1/L2), should be within the following range: 0.84<L1/L2<1.00, or more preferably, 0.84<L1/L2<0.95. Preferably, the BM percentage relative to the arrangement pitch P1 of the pixels P should be not less than 7% but not greater than 16.67%. By this means, it is possible to effectively improve the usage efficiency of color beams that have wavelengths that are different from one another, thereby providing the liquid crystal device 100 that has excellent optical characteristics. Preferably, the ratio of the width L1 of the first opening portion 17a to the width L3 of the third opening portion 17c, (L1/L3), should also be within the following range: 0.84<L1/L3<1.00, or more preferably, 0.84<L1/L3<0.95.

(3) The light-shielding portion 17 has an equal width (L4) between the opening portions in the sub pixels SR, SG, and SB. This structure reduces the risk of the mixture of color beams the wavelengths of which are different from each other.

Second Embodiment

Figure 11:
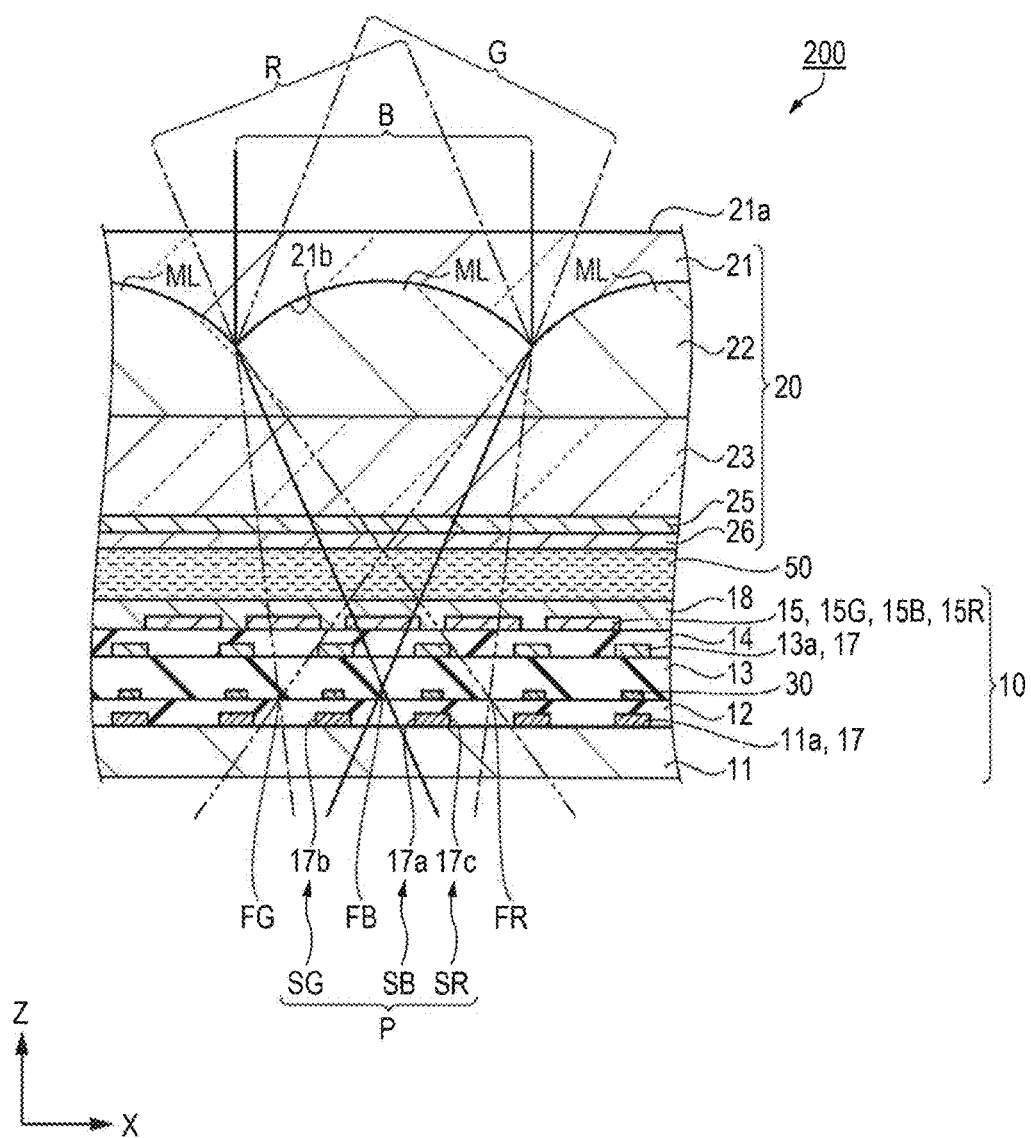
FIG. 11 is a schematic sectional view of the structure of a pixel in a liquid crystal device according to a second embodiment.
Figure 12:
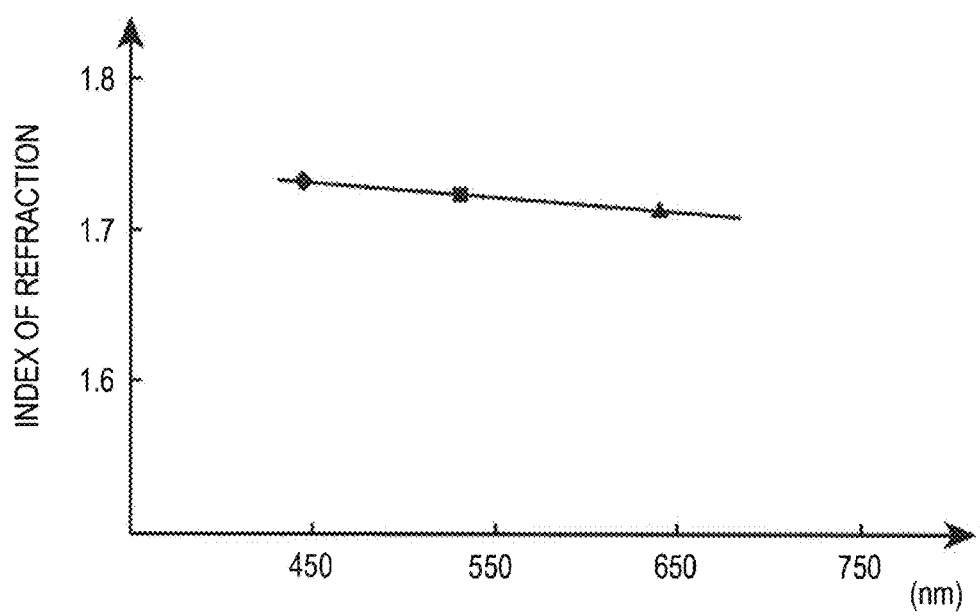
FIG. 12 is a graph that shows a relationship between the wavelength of light and the index of refraction of a micro lens.
Figure 13:
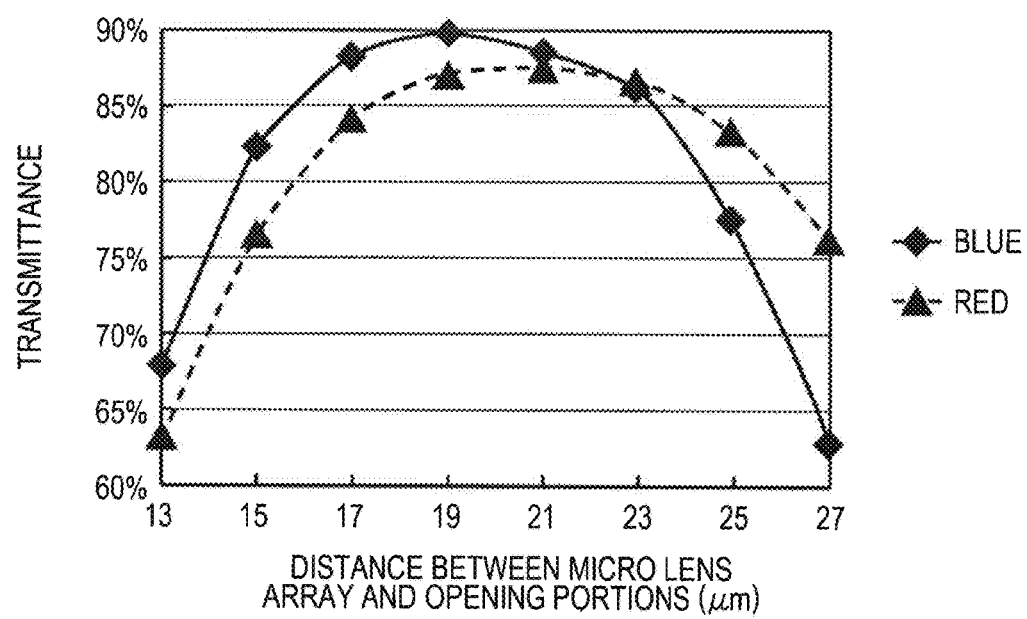
FIG. 13 is a graph that shows a relationship between a distance from a micro lens array to opening portions and transmittance at the opening portions.
Figure 14:
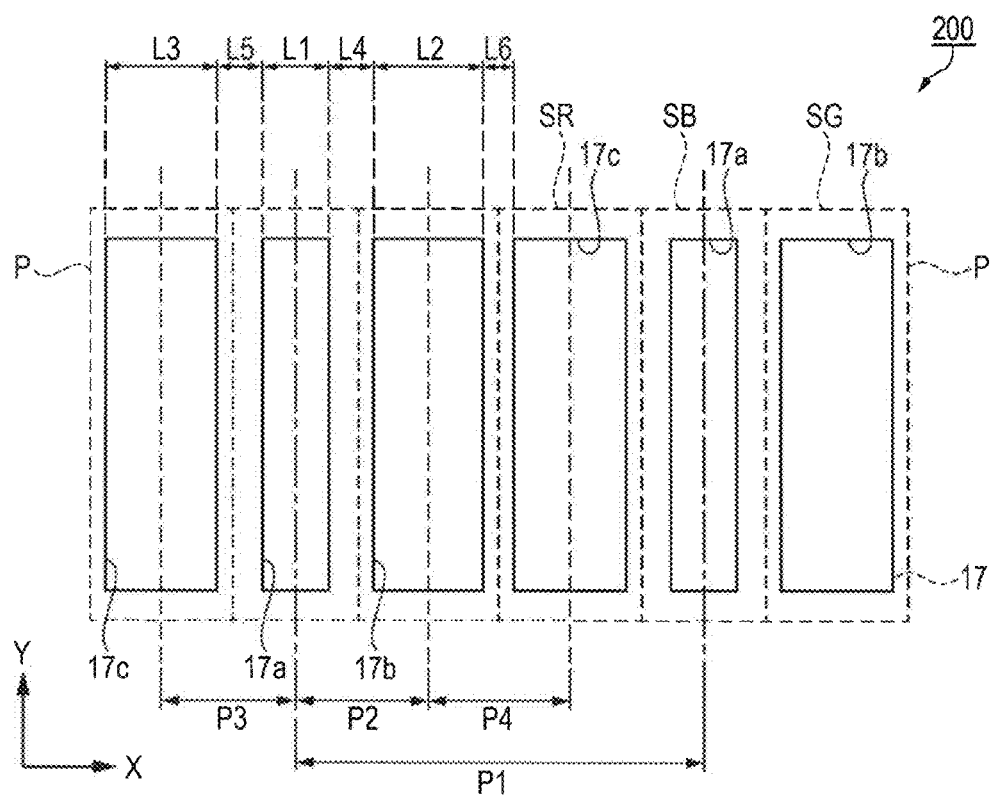
FIG. 14 is a plan view of the arrangement of sub pixels in a pixel according to the second embodiment.

Next, with reference to FIGS. 11 to 14, an electro-optical device according to a second embodiment will now be explained. FIG. 11 is a schematic sectional view of the structure of a pixel in a liquid crystal device according to a second embodiment. FIG. 12 is a graph that shows a relationship between the wavelength of light and the index of refraction of a micro lens. FIG. 13 is a graph that shows a relationship between a distance from a micro lens array to opening portions and transmittance at the opening portions. FIG. 14 is a plan view of the arrangement of sub pixels in a pixel according to the second embodiment.

The difference between a liquid crystal device 200, which is an electro-optical device according to the second embodiment, and the liquid crystal device 100 of the first embodiment lies in, firstly, the way as to how color beams enter a pixel P (micro lens ML), and, secondly, the structure of sub pixels SR, SG, and SB corresponding thereto. Therefore, the same reference numerals are assigned to components and portions that are the same as those of the liquid crystal device 100, and an explanation of them is not given here.

As illustrated in FIG. 11, the liquid crystal device 200, which is an electro-optical device according to the present embodiment, includes an element substrate 10, an opposite substrate 20, and a liquid crystal layer 50 sandwiched between these two substrates. Each pixel P includes a sub pixel SB, which is, in the present embodiment, a first sub pixel that is located at the center of the pixel P in the X direction, a sub pixel SG, which is a second sub pixel that is located adjacent to the sub pixel SB in the X direction, and a sub pixel SR, which is a third sub pixel that is located adjacent to the sub pixel SB in the X direction.

A first opening portion 17a corresponding to the sub pixel SB, a second opening portion 17b corresponding to the sub pixel SG, and a third opening portion 17c corresponding to the sub pixel SR are formed in the body 11 of the element substrate 10. The first opening portion 17a, the second opening portion 17b, and the third opening portion 17c are surrounded by a light-shielding portion 17, which is made up of wiring layers 11a and 13a formed on and over the substrate body 11. Translucent pixel electrodes 15 (15G, 15B, and 15R) corresponding to the respective sub pixels SG, SB, and SR are formed near the liquid crystal layer 50 over the substrate body 11. An alignment film 18, by which the pixel electrodes 15 are covered, is formed thereon.

The opposite substrate 20 has a micro lens array 22 that is made up of micro lenses ML. The micro lenses ML are formed by filling recesses 21b, which are formed in the body 21 of the opposite substrate 20, with a lens material. The opposite substrate 20 further includes a path layer 23, an opposite substrate 25, and an alignment film 26. The opposite substrate 25 is covered by the alignment film 26.

In the opposite substrate 20, each of the plural micro lenses ML is provided for the corresponding one of the plural pixels P, that is, with one-to-one correspondence. Color beams the wavelengths of which are different from one another come in through the light incidence surface 21a and enter the micro lens ML at respective angles of incidence that are different from one another. In the present embodiment, among the color beams the wavelengths of which are different from one another, the blue beam (B) enters the micro lens ML in the direction of the line normal to the light incidence surface 21a. The red beam (R) and the green beam (G) enter the micro lens ML obliquely at respective angles of incidence that are different from each other with respect to the direction of the line normal to the light incidence surface 21a. The modified way of the entering of color beams described above can be realized by modifying the specification and arrangement of the dichroic mirrors in the color separation element 1010 of the projection-type display device 1000 explained earlier in the first embodiment. That is, in the present embodiment, the blue beam (B) corresponds to a first color beam, the green beam (G) corresponds to a second color beam, and the red beam (R) corresponds to a third color beam.

The blue beam (B) of light is gathered by the micro lens ML and has a focal point (FB) inside the first opening portion 17a of the sub pixel SB at the element-substrate side 10. The green beam (G) of light is gathered by the micro lens ML and has a focal point (FG) inside the second opening portion 17b of the sub pixel SG at the element-substrate side 10. In like manner, the red beam (R) of light is gathered by the micro lens ML and has a focal point (FR) inside the third opening portion 17c of the sub pixel SR at the element-substrate side 10.

The index of refraction of the micro lens ML depends on the wavelength of light passing through the micro lens ML. As illustrated in FIG. 12, in the micro lens ML of the present embodiment, the index of refraction in the visible light wavelength region for the green beam (G), the typical wavelength $\lambda 2$ of which is, for example, 532 nm, is 1.72. The index of refraction for the blue beam (G), the typical wavelength $\lambda 1$ of which is shorter than 532 nm, for example, 445 nm, is greater than that of the green beam (G). The index of refraction for the red beam (R), the typical wavelength $\lambda 3$ of which is longer than 532 nm, for example, 640 nm, is less than that of the green beam (G). Therefore, the focal distance of the color beam of light gathered by the micro lens ML differs depending on the wavelength of the color beam, though the difference is very small. This optical property of the micro lens ML is called as wavelength dispersion.

Under the conditions of the optical simulation described earlier in the first embodiment, as illustrated in FIG. 13, the transmittance of the blue beam (B) at the first opening portion 17a is substantially equal to the transmittance of the red beam (R) at the third opening portion 17c when the distance from the micro lens array (MLA) 22 to the opening portions is approximately 23 μm. The transmittance of the blue beam (B), the wavelength of which is shorter, is higher than the transmittance of the red beam (R) when the distance from the micro lens array 22 to the opening portions is within a range from 13 to 21 μm, which is shorter than 23 μm. The transmittance of the red beam (R), the wavelength of which is longer, is higher than the transmittance of the blue beam (B) when the distance from the micro lens array 22 to the opening portions is within a range from 25 to 27 μm, which is longer than 23 μm. The distance from the micro lens array 22 to the opening portions is the distance from the boundary between the micro lens array 22 and the path layer 23 to the wiring layer 13a in which the opening portions are formed (refer to FIG. 6).

One possible way to increase the usage efficiency of color beams that enter a micro lens ML for an improvement in display brightness is to increase the light-gathering capability of the micro lens ML. However, if the light-gathering capability of the micro lens ML is increased, the focal distance of each color beam of light gathered by the micro lens ML becomes shorter. Therefore, it is necessary to make the distance from the micro lens array 22 to the opening portions shorter. If done so, the angle of incidence of the color beam entering the opening portion also increases. Therefore, it is more likely that the color beam coming in obliquely with respect to the direction of the line normal to the light incidence surface 21a of the opposite substrate 20 will be blocked by the light-shielding portion 17 between the opening portions.

In view of this fact, in the present embodiment, the arrangement of the sub pixels SG, SB, and SR in each pixel P and the width of the opening portion in each of the sub pixels SG, SB, and SR in the predetermined direction (X direction) are determined with the wavelengths of color beams entering the micro lens ML of the pixel P taken into consideration. Specifically, as illustrated in FIG. 14, the sub pixel SB, which receives the blue beam (B), that is, the one whose wavelength is the shortest, is located at the center of the pixel P in the predetermined direction (X direction). The sub pixels SG and SR are located adjacent to the sub pixel SB. The green beam (G), the wavelength of which is longer than that of the blue beam (B), enters the sub pixel SG. The red beam (R), the wavelength of which is longer than that of the blue beam (B), enters the sub pixel SR.

Let L1 be the width of the first opening portion 17a of the sub pixel SB in the X direction. Let L2 be the width of the second opening portion 17b of the sub pixel SG in the X direction. Let L3 be the width of the third opening portion 17c of the sub pixel SR in the X direction. The first opening portion 17a, the second opening portion 17b, and the third opening portion 17c are formed in the light-shielding portion 17 in such a way as to satisfy a relationship of L1<L2<L3. The width (length) of each of the first opening portion 17a, the second opening portion 17b, and the third opening portion 17c in the Y direction is the same as that of the others.

Let L4 be the width of the light-shielding portion 17 between the first opening portion 17a and the second opening portion 17b. Let L5 be the width of the light-shielding portion 17 between the first opening portion 17a and the third opening portion 17c. Let L6 be the width of the light-shielding portion 17 between the third opening portion 17c in one of two pixels P arranged adjacent to each other in the X direction and the second opening portion 17b in the other. The light-shielding portion 17 is formed in such a way as to satisfy a relationship of L4=L5>L6.

When the blue beam (B), the wavelength of which is the shortest among the color beams, enters the sub pixel SB located at the center of the pixel P, the relationship may be L1<L2=L3. In this case, the relationship regarding the width of the light-shielding portion 17 between the opening portions may be L4=L5=L6.

The second embodiment described above produces the following advantageous effects.

In the above structure of the liquid crystal device 200, among the color beams the wavelengths of which are different from one another, the blue beam (B), which has the shortest wavelength, enters the micro lens ML in the direction of the line normal to the light incidence surface 21a of the opposite substrate 20, and the green beam (G) and the red beam (R), the wavelength of each of which is longer than that of the blue beam (B), enters the micro lens ML obliquely with respect to the direction of the line normal to the light incidence surface 21a. In addition, in accordance with the wavelength of each color beam of light gathered by the micro lens ML and entering the corresponding sub pixel SG, SB, SR, the width of the opening portion in each of these sub pixels in the X direction and the width of the light-shielding portion 17 between the opening portions are optimized. Since it is possible to make the light-gathering spot area of the blue beam (B) of light gathered by the micro lens ML narrower than that of the first embodiment, even though the width L1 of the first opening portion 17a is less than that of the first embodiment, it is possible to ensure sufficient transmittance of the blue beam (B) at the first opening portion 17a. Moreover, since the width L1 of the first opening portion 17a is less than that of the first embodiment, it is possible to increase the width L2 of the second opening portion 17b and the width L3 of the third opening portion 17c by the corresponding amount, resulting in better transmittance at the second opening portion 17b and the third opening portion 17c than that of the first embodiment. By using the liquid crystal device 200 having the above structure as an optical modulator, it is possible to provide the projection-type display device 1000 that is capable of performing bright full-color display without using any color filter.

The present invention should be in no case interpreted to be limited to the specific embodiments described above. The invention may be modified within a range not departing from the gist or spirit of the invention apprehended by those skilled in the art from explicit and implicit description given herein as well as recitation of appended claims. An electro-optical device subjected to such modification and an electronic apparatus to which such an electro-optical device is applied are also within the technical scope of the invention. Various modifications of the foregoing embodiments are conceivable. Some modification examples are described below.

First Modification Example

The electro-optical device functioning as an optical modulator is not limited to a liquid crystal device. For example, the invention may be applied to a transmissive-type MEMS (Micro Electro Mechanical System) display.

Second Modification Example

The electronic apparatus to which the liquid crystal device 100 of the first embodiment is applied is not limited to the projection-type display device 1000. For example, it can be suitably used as an optical modulator for an HUD (Head Up Display) or an HMD (Head Mount display). The same holds true for the liquid crystal device 200 of the second embodiment.

This application claims priority to Japan Patent Application No. 2015-98824 filed May 14, 2015, the entire disclosures of which are hereby incorporated by reference in their entireties.

What is claimed is:
1. An electro-optical device, comprising:
a plurality of pixels each of which includes a first sub pixel, a second sub pixel that is located adjacent to the first sub pixel in a predetermined direction, and a third sub pixel, light emitted from a light source being split into a first color beam, a second color beam, and a third color beam, wavelengths of the first, second, and third color beams being different from one another, the first color beam entering the first sub pixel, the second color beam entering the second sub pixel, and the third color beam entering the third sub pixel;
a plurality of light-gathering elements each of which is provided for the corresponding one of the pixels, the first, second, and third color beams entering the light-gathering element at respective angles of incidence that are different from one another;
a light-shielding portion that partitions off a first opening portion, a second opening portion, and a third opening portion from one another, the first opening portion corresponding to the first sub pixel, the second opening portion corresponding to the second sub pixel, and the third opening portion corresponding to the third sub pixel, wherein, when a width of the first opening portion in the predetermined direction is defined as L1 and when a width of the second opening portion or the third opening portion in the predetermined direction is defined as L2, a relationship of L1<L2 holds true.

2. The electro-optical device according to claim 1, wherein a width of the light-shielding portion between the first opening portion and the second opening portion in the predetermined direction is the same as a width of the light-shielding portion between the first opening portion and the third opening portion in the predetermined direction.

3. The electro-optical device according to claim 1, wherein a relationship of 0.84<L1/L2<1.00 holds true.

4. The electro-optical device according to claim 1, wherein percentage of a width of the light-shielding portion in the predetermined direction in relation to an arrangement pitch of the pixels in the predetermined direction is not less than 7% but not greater than 16.67%.

5. The electro-optical device according to claim 1, wherein the wavelength of the first color beam is shorter than that of the second color beam and the third color beam.

6. The electro-optical device according to claim 5, wherein, when the wavelengths of the first, second, and third color beams are defined as λ1, λ2, and λ3 respectively, a relationship of λ1<λ2<λ3 holds true; and wherein, when the widths of the first, second, and third opening portions are defined as L1, L2, and L3 respectively, a relationship of L1<L2<L3 holds true.

7. An electronic apparatus, comprising:
the electro-optical device according to claim 1;
the light source; and
a color separation element that splits the light emitted from the light source into the first, second, and third color beams, the wavelengths of which are different from one another.

8. An electronic apparatus, comprising:
the electro-optical device according to claim 2;
the light source; and
a color separation element that splits the light emitted from the light source into the first, second, and third color beams, the wavelengths of which are different from one another.

9. An electronic apparatus, comprising:
the electro-optical device according to claim 3;
the light source; and
a color separation element that splits the light emitted from the light source into the first, second, and third color beams, the wavelengths of which are different from one another.

10. An electronic apparatus, comprising:
the electro-optical device according to claim 4;
the light source; and
a color separation element that splits the light emitted from the light source into the first, second, and third color beams, the wavelengths of which are different from one another.

11. An electronic apparatus, comprising:
the electro-optical device according to claim 5;
the light source; and
a color separation element that splits the light emitted from the light source into the first, second, and third color beams, the wavelengths of which are different from one another.

12. An electronic apparatus, comprising:
the electro-optical device according to claim 6;
the light source; and
a color separation element that splits the light emitted from the light source into the first, second, and third color beams, the wavelengths of which are different from one another.

* * * * *